US008482651B2

(12) United States Patent
Asukai et al.

(10) Patent No.: US 8,482,651 B2
(45) Date of Patent: Jul. 9, 2013

(54) IMAGE PROCESSING DEVICE AND IMAGE PROCESSING METHOD

(75) Inventors: Masamichi Asukai, Kanagawa (JP); Masaaki Tsuruta, Tokyo (JP); Taiji Ito, Kanagawa (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 386 days.

(21) Appl. No.: 12/449,230

(22) PCT Filed: Jan. 10, 2008

(86) PCT No.: PCT/JP2008/050214
§ 371 (c)(1),
(2), (4) Date: Jul. 29, 2009

(87) PCT Pub. No.: WO2008/099627

PCT Pub. Date: Aug. 21, 2008

(65) Prior Publication Data

US 2010/0066840 A1 Mar. 18, 2010

(30) Foreign Application Priority Data

Feb. 15, 2007 (JP) ................................ P2007-034558

(51) Int. Cl.

| | |
|---|---|
| ***H04N 5/222*** | (2006.01) |
| ***H04N 5/228*** | (2006.01) |
| ***H04N 5/225*** | (2006.01) |
| ***H04N 5/76*** | (2006.01) |
| ***H04N 5/262*** | (2006.01) |
| ***G06K 9/00*** | (2006.01) |
| ***G06K 9/40*** | (2006.01) |

(52) U.S. Cl.
USPC .............. 348/333.12; 348/208.13; 348/218.1; 348/222.1; 348/231.99; 348/239; 348/333.01; 382/103; 382/275

(58) Field of Classification Search
USPC ................. 348/207.99, 207.1, 208.99, 208.1, 348/208.13, 218.1, 222.1, 231.99–231.3, 348/239, 241, 333.01–333.12; 382/103, 274–279, 282–283
See application file for complete search history.

(56) References Cited

U.S. PATENT DOCUMENTS 4,901,096 A 2/1990 Lemelson
5,463,443 A 10/1995 Tanaka et al.

(Continued)

FOREIGN PATENT DOCUMENTS

CN 1812501 A 8/2006
JP 63-053531 A 3/1988

(Continued)

OTHER PUBLICATIONS

Newton, "Philosophiae Naturalis Principia Mathematica" 1687, p. 12-13, vol. 1, Royal Society, London.

(Continued)

*Primary Examiner* — Michael Osinski
(74) *Attorney, Agent, or Firm* — Wolf, Greenfield & Sacks, P.C.

(57) ABSTRACT

Among pickup image data items of multiple frames picked up at different time instants, an image of a certain frame is regarded as a synthesizing base image. The synthesizing base image and an image of another frame are used to perform synthesizing processing. Specifically, an object-of-synthesis area is designated in the frame image regarded as the synthesizing base image, and processing of replacing pixel data in the object-of-synthesis area with pixel data in another frame is carried out. For example, if a person having his/her eyes closed appears in the synthesizing base image that is a group-photograph image, the part of the person's face is regarded as the object-of-synthesis area. As another frame, an image in which the person has his/her eyes left open is searched. Pixel data in the facial image part showing the open eyes is fetched and synthesized with the synthesizing base image. Thus, a group photograph in which all people have their eyes left open is produced.

17 Claims, 20 Drawing Sheets

U.S. PATENT DOCUMENTS

| | | | | |
|---|---|---|---|---|
| 5,905,848 | A | 5/1999 | Yano et al. | |
| 5,923,908 | A | 7/1999 | Schrock et al. | |
| 6,677,969 | B1 | 1/2004 | Hongo | |
| 6,898,300 | B1 | 5/2005 | Iwaki et al. | |
| 7,035,440 | B2 | 4/2006 | Kaku | |
| 7,596,307 | B2 | 9/2009 | Tomita et al. | |
| 7,711,253 | B2 | 5/2010 | Tomita et al. | |
| 2001/0010544 | A1 | 8/2001 | Wakui | |
| 2004/0130628 | A1 | 7/2004 | Stavely | |
| 2004/0223649 | A1* | 11/2004 | Zacks et al. | 382/218 |
| 2005/0046730 | A1 | 3/2005 | Li | |
| 2005/0129324 | A1* | 6/2005 | Lemke | 382/254 |
| 2006/0165396 | A1 | 7/2006 | Yamazaki | |
| 2006/0171707 | A1 | 8/2006 | Higuma | |
| 2006/0228029 | A1 | 10/2006 | Zhang et al. | |
| 2006/0257026 | A1 | 11/2006 | Shiffer et al. | |
| 2007/0014543 | A1 | 1/2007 | Nakase et al. | |
| 2007/0076960 | A1 | 4/2007 | Takamori et al. | |
| 2008/0231714 | A1 | 9/2008 | Estevez et al. | |
| 2008/0239092 | A1 | 10/2008 | Sugino et al. | |
| 2008/0273798 | A1 | 11/2008 | Asukai et al. | |
| 2008/0316339 | A1 | 12/2008 | Sugino et al. | |
| 2009/0016645 | A1 | 1/2009 | Sako et al. | |

FOREIGN PATENT DOCUMENTS

| | | | |
|---|---|---|---|
| JP | 03-092830 | A | 4/1991 |
| JP | 05-142616 | A | 6/1993 |
| JP | 06-030374 | A | 2/1994 |
| JP | 07-043803 | A | 2/1995 |
| JP | 07-218970 | A | 8/1995 |
| JP | 08-110540 | A | 4/1996 |
| JP | 10-048681 | A | 2/1998 |
| JP | 11-174520 | A | 7/1999 |
| JP | 11-205761 | A | 7/1999 |
| JP | 2000-132693 | | 5/2000 |
| JP | 2001-197296 | | 7/2001 |
| JP | 2002-023716 | A | 1/2002 |
| JP | 2002-049912 | A | 2/2002 |
| JP | 2003-110999 | A | 4/2003 |
| JP | 2004-062560 | A | 2/2004 |
| JP | 2004-120404 | A | 4/2004 |
| JP | 2004-134950 | | 4/2004 |
| JP | 2004-242360 | A | 8/2004 |
| JP | 2005-110004 | A | 4/2005 |
| JP | 2005-182526 | A | 7/2005 |
| JP | 2005-303511 | A | 10/2005 |
| JP | 3740351 | B | 11/2005 |
| JP | 2005-352239 | A | 12/2005 |
| JP | 2006-050163 | A | 2/2006 |
| JP | 2006-197373 | A | 7/2006 |
| JP | 2006-201531 | A | 8/2006 |
| JP | 2006-202049 | A | 8/2006 |
| JP | 2006-202181 | A | 8/2006 |
| JP | 2006-203600 | A | 8/2006 |
| JP | 2006-221378 | A | 8/2006 |
| JP | 2006-279291 | A | 10/2006 |
| JP | 2006-319610 | A | 11/2006 |
| JP | 2006-330800 | | 12/2006 |
| JP | 2006-331271 | A | 12/2006 |
| JP | 2007-166542 | | 6/2007 |
| JP | 2007-249527 | A | 9/2007 |

OTHER PUBLICATIONS

Hirasawa et al., "Development of Face Image Capturing System for Best Appearance—The Improvement of the Face Detection Algorithm", Institute of Electronics, Information and Communication Engineers Technical Study Reports, Japan, Corporate Judicial Person Institute of Electronics, Information and Communication Engineers, Nov. 11, 2004, vol. 104, No. 449, p. 61-66.

Agarwala et al., Interactive digital photomontage. ACM Transactions on Graphics: TOG, ACM, US. Aug. 1, 2004;3(23):294-302.

* cited by examiner (a)

(b)

(c)

(d)

(a)

(b)

(a)

| IMAGE MANAGEMENT INFORMATION | PICKUP IMAGE DATA | | | | | | SYNTHETIC IMAGE DATA |
|---|---|---|---|---|---|---|---|
| C1 | F#1 TM1 | F#2 TM2 | F#3 TM3 | F#4 TM4 | F#5 TM5 | ... | — |
| C2 | F#1 TM1 | F#2 TM2 | F#3 TM3 | F#4 TM4 | F#5 TM5 | ... | — |
| C3 | F#1 TM1 | F#2 TM2 | F#3 TM3 | F#4 TM4 | F#5 TM5 | ... | — |
| ... | ... | ... | ... | ... | ... | | |

VD1
VD2
VD3

(b)

| IMAGE MANAGEMENT INFORMATION | PICKUP IMAGE DATA | | | | | | SYNTHETIC IMAGE DATA |
|---|---|---|---|---|---|---|---|
| C1 | F#1 TM1 | F#2 TM2 | F#3 TM3 | F#4 TM4 | F#5 TM5 | ... | mVD1 |
| C2 | F#1 TM1 | F#2 TM2 | F#3 TM3 | F#4 TM4 | F#5 TM5 | ... | mVD2 |
| C3 | F#1 TM1 | F#2 TM2 | F#3 TM3 | F#4 TM4 | F#5 TM5 | ... | mVD3 |
| ... | ... | ... | ... | ... | ... | | |

VD1
VD2
VD3

(a)

(b)

PICKUP IMAGE (a)

PICKUP IMAGE (b)

PICKUP IMAGE (c)

(a)

(b)

(a)

(b)

(a)

(b)

(a)

(b)

IMAGE PROCESSING DEVICE AND IMAGE PROCESSING METHOD

CROSS REFERENCE TO RELATED APPLICATIONS

This application claims the benefit under 35 U.S.C. § 371 as a U.S. national stage entry of International Patent Application Serial No. PCT/JP2008/050214 filed on Jan. 10, 2008, which claims priority to Japanese Priority Patent Application JP 2007-034558, filed in the Japan Patent Office on Feb. 15, 2007. The entire contents of both applications are incorporated herein by reference to the maximum extent allowable by the law.

TECHNICAL FIELD

The present invention relates to an image processing device and an image processing method that performs synthesizing processing on pickup image data items.

BACKGROUND ART

In JP-A-2004-134950, a technology for synthesizing a raw image, which is produced according to a computer graphics, with an image picked up by a camera is disclosed.

In general, when a user performs camera imaging, a person who is a subject may close his/her eyes at a shutter release timing or may harden his/her facial expression. The pickup image may not be preferable. In particular, when a group photograph is taken, the pickup image may often be such that some of persons who are subjects close their eyes.

In order to image a person with a soft expression in consideration of blinks or a change in expression, an imaging device side may presumably perform, for example, smile detection or blink detection on the person who is a subject. This is such that the imaging device side analyzes a facial image represented by image data fetched in a monitor state preceding a shutter release timing, and extends control so that the shutter will be released the instant the person smiles, or such that the imaging device extends control for fear the shutter may be released while the person blinks or anyway closes his/her eyes. According to this technology, no problem presumably occurs as long as there is only one subject or person. However, when a group photograph is taken of numerous people, an event that the shutter is not released immediately may take place.

In addition, since a person or an entity other than an intended person or entity that is a subject may be imaged, a satisfaction level with an image may be lowered. An image may be partly too dark or too bright because of the relationship of a light and a dark caused by sunshine or lighting.

As mentioned above, normally, when imaging is performed, the resultant image is often unsatisfactory to an imaging person. The present invention is intended to make it possible to readily produce a pickup image whose satisfaction level is high.

DISCLOSURE OF THE INVENTION

An image processing device of the present invention includes: an acquisition means that acquires pickup image data items of multiple frames, which are picked up at different times, as pickup image data items to be used for synthesizing processing; an image synthesis means that designates an object-of-synthesis area in a certain frame out of the multiple frames acquired by the acquisition means, and produces synthetic image data by performing synthesizing processing of replacing pixel data in the object-of-synthesis area with pixel data in another frame out of the multiple frames; and a preserving processing means that performs preserving processing on the synthetic image data produced by the image synthesis means.

The acquisition means includes an imaging unit that picks up an image. Through imaging by the imaging unit, the acquisition means acquires pickup image data of at least one frame included in the pickup image data items to be used for the synthesizing processing, or pickup image data items of multiple frames to be used for the synthesizing processing. The imaging unit is formed using a CCD sensor or a CMOS sensor as an image sensor.

The acquisition means includes a communication unit that communicates with external equipment. Through communication with the external equipment by the communication unit, the acquisition means receives and acquires pickup image data of at least one frame included in the pickup image data items to be used for the synthesizing processing.

The acquisition unit includes a reproduction unit that reproduces information from a portable recording medium. Through reproduction from the portable recording medium by the reproduction unit, the acquisition means acquires pickup image data of at least one frame included in the pickup image data items to be used for the synthesizing processing.

The preserving processing means includes a recording unit that records information in a recording medium, and records as the preserving processing the synthetic image data in the recording medium.

The preserving processing means includes a communication unit that communicates with external equipment, and transmits as the preserving processing the synthetic image data to the external equipment.

The image synthesis means designates the object-of-synthesis area through image analyzing processing. In particular, the image synthesis means discriminates all or part of the opening or closing of the eyes in a facial image of a person appearing in a frame image, the facial expression, the direction of the face, and the color of the eyeballs, and designates the object-of-synthesis area on the basis of the result of the discrimination.

An operating input means is further included. The image synthesis means designates the object-of-synthesis area according to an input sent from the operating input means.

The image synthesis means performs image analyzing processing on each of the multiple frames so as to select a frame serving as another frame, and extracts pixel data, which is synthesized with the object-of-synthesis area, from the selected frame.

The image synthesis means selects a frame serving as another frame from among the multiple frames according to an input sent from the operating input means, and extracts pixel data, which is synthesized with the object-of-synthesis area, from the selected frame.

An image output means that performs outputting processing on the synthetic image data is further included.

The image output means includes a display unit, and performs as the outputting processing displaying or outputting of the synthetic image data on or to the display unit.

The image output means includes a communication unit that communicates with external equipment, and uses the communication unit to perform as the outputting processing transmission or output of the synthetic image data to the external equipment.

The image output means includes a recording unit that records information in a portable recording medium, and uses the recording unit to record as the outputting processing the synthetic image data in the portable recording medium.

An image processing method of the present invention includes: a step of acquiring pickup image data items of multiple frames, which are picked up at different times, as pickup image data items to be used for synthesizing processing; a step of designating an object-of-synthesis area in a certain frame out of the acquired multiple frames, and producing synthetic image data by performing the synthesizing processing of replacing pixel data in the object-of-synthesis area with pixel data in another frame out of the multiple frames; and a step of performing preserving processing on the produced synthetic image data.

In the foregoing present invention, pickup image data items of multiple frames picked up at different times are acquired by inputting image data items that are, for example, picked up or picked up by an external imaging device. What are referred to as the pickup image data items of multiple frames picked up at different times are images of successive frames, for example, frames of a motion picture, or images of frames picked up at intervals of several hundreds of milliseconds, one second, or several seconds. Naturally, images of multiple frames picked up at intervals of a longer time (for example, several minutes, several hours, a day, or a year) will do.

When the images of multiple frames are acquired, synthesizing processing is performed by regarding an image of a certain frame as a reference (hereinafter, an image to be regarded as a reference shall be called a synthesizing base image), and using an image of another frame. Specifically, an object-of-synthesis area is designated in a frame image regarded as the synthesizing base image, and processing of replacing pixel data in the object-of-synthesis area with pixel data in another frame is carried out.

For example, assuming that a person whose eyes are closed appears in a synthesizing base image that is a group-photograph image, the person's face part shall be regarded as an object-of-synthesis area. An image in which the person opens his/her eyes is searched as another frame. Pixel data of the facial image part showing the face whose eyes are open is extracted and synthesized with the synthesizing base image. By performing this processing, a group photograph in which all people open their eyes can be readily produced.

According to the present invention, when synthesizing processing of replacing an object-of-synthesis area, which is part of an image, with pixel data in an image of another frame is performed, a pickup image whose user satisfaction level is high can be readily produced.

BEST MODE FOR CARRYING OUT THE INVENTION

Figure 1:
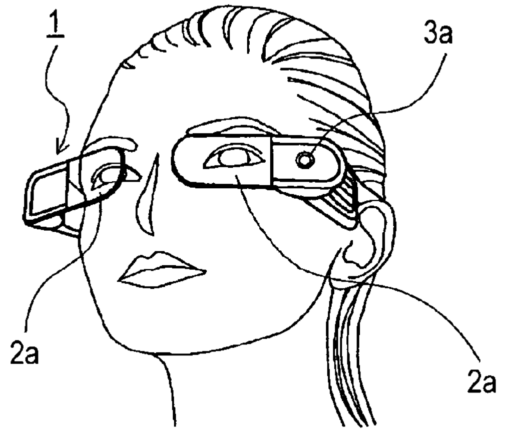
FIG. 1 includes explanatory diagrams of examples of the appearance of an imaging device of an embodiment of the present invention.
Figure 1:
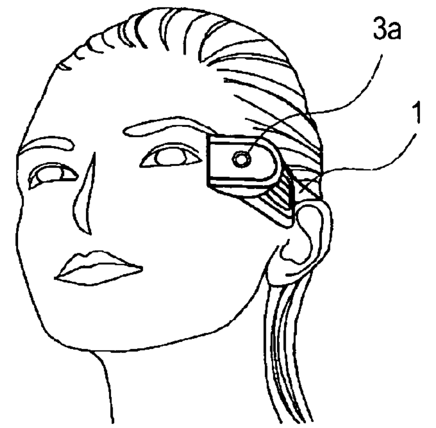
Figure 1:
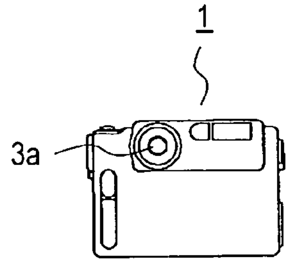
Figure 1:
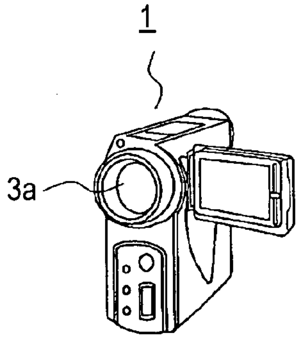

Now, an embodiment of an image processing device and an image processing method of the present invention will be described below. A description will be made by taking an imaging device as an example of the image processing device. The image processing device of the present invention can be implemented in any equipment other than the imaging device as described later as variants and extended examples.

A description will be made in the order presented below.

1. Examples of the appearance of an imaging device
2. Example of the constitution of the imaging device
3. Image synthesis and preservation
4. Image synthesizing processing
5. Advantage of the embodiment, variants, and extended examples 1. Examples of the Appearance of an Imaging Device As an imaging device 1 of an embodiment, various forms are presumable. Sections (a), (b), (c), and (d) of FIG. 1 show examples of the appearance of the imaging device 1.

Section (a) of FIG. 1 shows the imaging device 1 formed as an eyeglasses type display camera. The imaging device 1 includes a mounting unit structured like a frame that semi-encircles the head while covering both the temporal parts and the occipital part, and that is, as illustrated hung on both the auricles and thus worn by a user.

The imaging device 1 has a pickup lens 3*a* directed forward so that the pickup lens will image the direction of a user's field of view as a subject direction with the imaging device worn by a user.

In a worn state like the illustrated one, a pair of display panels 2*a*, 2*a* for the left eye and right eye respectively is disposed at the positions immediately ahead of the user's eyes, that is, at the positions at which the lenses of ordinary eyeglasses are located. As the display panels 2*a*, for example, a liquid crystal panel is adopted. By controlling the transmittance, a see-through state like the illustrated one, that is, a transparent state or a translucent state can be attained. When the display panels 2*a* are brought to the see-through state, even if the user wears the imaging device like eyeglasses all the time, a daily life will not be hindered.

Aside from the constitution having the pair of display panels 2*a* associated with the eyes, a constitution having one display panel associated with one of the eyes is conceivable.

Section (b) of FIG. 1 shows the imaging device 1 which a user wears on his/her head and which does not, unlike the one shown in section (a) of FIG. 1, include the display panels 2*a*. The imaging device is mounted on the user's head with, for example, amounting unit that is hung on the auricles. The imaging lens 3*a* is directed forward so that the imaging lens will image the direction of the user's field of view as a subject direction with the imaging device mounted on the user's head.

In sections (a) and (b) of FIG. 1, the imaging devices 1 are mounted on the user's head with the eyeglasses type or head-mounted type mounting unit. Diverse structures allowing a user to wear the imaging device 1 are conceivable. Any type of mounting unit, for example, a headphone type, a neckband type, or a behind-the-ear type of mounting unit may be used to mount the imaging device on a user. Further, for example, the imaging device may be worn by a user in such a manner that the imaging device is attached to, for example, ordinary eyeglasses, a visor, a headphone, or the like using a clip or any other attachment. The imaging device need not always be mounted on the user's head.

The imaging direction is set to the direction of a user's field of view. A constitution in which the imaging lens 3*a* is disposed so that when the imaging device is worn, the imaging lens 3*a* will image a backward direction of a user, a lateral direction thereof, an upward direction thereof, or an underfoot direction thereof, or a constitution including multiple imaging systems whose imaging directions are identical to one another or different from one another is also conceivable.

Further, an imaging-direction variation mechanism permitting manual or automatic variation of a subject direction may be included for one imaging lens 3*a* or multiple imaging lenses 3*a*.

Section (c) of FIG. 1 shows the imaging device 1 having a form generally known as a digital still camera.

Section (d) of FIG. 1 shows the imaging device 1 having a form generally known as a video camera.

Like those shown in sections (c) and (d) of FIG. 1, even the imaging device 1 a user carries for use is a form of the embodiment of the present invention. Although the imaging lens 3*a* alone is shown in the drawings, a panel display unit for imaging monitor, a viewfinder, and other display devices are also included.

Needless to say, as an imaging device that picks up a still image or a motion picture, forms other than the forms shown in sections (a), (b), (c), and (d) of FIG. 1 are conceivable. For example, a portable cellular phone, a personal digital assistant (PDA), a portable personal computer, or any other equipment having the capability of an imaging device is presumably encompassed in the imaging device 1 of the present embodiment.

In the foregoing forms, for example, a microphone that collects external sounds may be included. During imaging, an audio signal to be recorded together with image data may be acquired. A loudspeaker section that outputs sounds or an earphone section may be formed.

A light emitting unit that illuminates a subject direction may be disposed near the imaging lens 3*a* using, for example, light-emitting diodes (LEDs). A flashlight emitting unit may be included for still-image pickup.

2. Example of the Constitution of an Imaging Device

An example of the constitution of the imaging device 1 will be described in conjunction with FIG. 2.

A system controller 10 is realized with a microcomputer including, for example, a central processing unit (CPU), a read-only memory (ROM), a random access memory (RAM), a nonvolatile memory unit, an interface unit, and serves as a control unit that controls the whole of the imaging device 1. The system controller 10 transfers control signals or the like to or from components over a bus 13 through various pieces of arithmetic processing according to programs preserved in the internal ROM or the like, and thus allows the components to carry out given actions.

An imaging unit 3 includes an imaging optical system, an image sensor block, and a pickup signal processing block.

The imaging optical system in the imaging unit 3 includes a lens system including the imaging lens 3*a* shown in FIG. 1, a diaphragm, a zoom lens, a focus lens, and others, and a driving system that causes the lens system to perform a focus motion or a zoom motion.

The image sensor block in the imaging unit 3 includes a solid-state image sensor array that detects pickup light obtained in the imaging optical system, and photoelectrically converts the pickup light so as to produce a pickup signal. The solid-state image sensor array is, for example, a charge-coupled device (CCD) sensor array or a complementary metal oxide semiconductor (CMOS) sensor array.

The pickup signal processing block in the imaging unit 3 includes a sample-and-hold/automatic gain control (AGC) circuit that performs gain control or wave reshaping on a signal produced by a solid-state image sensor, and a video A/D converter, and produces pickup image data as digital data. The pickup signal processing block performs white balance processing, luminance processing, color signal processing, blur correcting processing, or the like on the pickup image data.

The imaging unit 3 including the imaging optical system, image sensor block, and pickup signal processing block performs imaging so as to produce pickup image data.

Image data derived from an imaging action of the imaging unit 3 is processed by an imaging control unit 6.

Under the control of the system controller 10, the imaging control unit 6 performs the processing of converting pickup image data into a predetermined image data format, or the processing of feeding the resultant pickup image data to an image analysis/synthesis unit 12, a storage unit 14, a communication unit 15, and a display control unit 7 according to an acting situation.

Based on an instruction of the system controller 10, the imaging control unit 6 performs on/off control of an imaging action in the imaging unit 3, drive and control of the zoom lens and focus lens of the imaging optical system, control of the sensitivity of the image sensor block or the frame rate thereof, control of parameters for each processing of the pickup signal processing block, or designation of executing processing.

When the imaging unit 3 performs still-image pickup, an action of continuously fetching a pickup image can be executed as a so-called continuous shutter release function. For example, the imaging control unit 6 performs the processing of continuously fetching pickup image data at intervals of a predetermined time, such as, several tens of milliseconds, several hundreds of milliseconds, one second, or several seconds responsively to one shutter release manipulation performed by a user. Namely, the imaging unit 3 can produce pickup image data in units of a frame and output the pickup image data to the imaging control unit 6. During one still-image pickup, the imaging control unit 6 fetches, in addition to a frame at the shutter release timing, pickup image data items of multiple frames picked up at different times.

When pickup image data items of multiple frames are fetched by the continuous shutter release function, the imaging control unit 6 may change any of parameters concerning pickup signal processing at every timing of fetching a frame, and thus may differentiate a luminance level during signal processing, change shades, or change sensitivities. Multiple frames may be fetched by varying a focus state (focal length), whereby pickup images of different focal lengths may be acquired as respective frames.

Each frame may be continuously fetched as pickup image data similarly to so-called motion-picture pickup.

The image analysis/synthesis unit 12 uses pickup image data items of multiple frames, which the imaging device 1 has acquired, to perform image synthesizing processing.

What is referred to as pickup image data items of multiple frames to be adopted as objects of synthesizing processing are, for example, pickup image data items of multiple frames picked up by the continuous shutter release function.

As pickup image data which the imaging device 1 can acquire, pickup image data picked up by an external imaging device may be adopted. For example, the pickup image data picked up by the external imaging device may be transmitted from the imaging device or a server device, and received by the communication unit 15.

Pickup image data picked up by an external imaging device may be recorded in a portable recording medium, and the portable recording medium may be reproduced in the storage unit 14 (in a case where the storage unit 14 has a reproducing function for the portable recording medium) in order to acquire the data.

Therefore, pickup image data items of multiple frames received by the communication unit 15 may be adopted as objects of synthesizing processing to be performed by the image analysis/synthesis unit 12.

Pickup image data items of multiple frames reproduced and read from the portable recording medium may be adopted as objects of synthesizing processing to be performed by the image analysis/synthesis unit 12.

Further, when the imaging unit 3 and imaging control unit 6 acquire pickup image data of one frame as a result of normal still-image pickup at a shutter release timing without the use of the continuous shutter release function, the pickup image data and pickup image data items received by the communication unit 15 or pickup image data items read from the portable recording medium may be used in combination as pickup image data items of multiple frames to be regarded as objects of synthesizing processing.

The image analysis/synthesis unit 12 can be realized with a microcomputer or a digital signal processor (DSP) serving as a video processor. In FIG. 2, the image analysis/synthesis unit 12 is depicted with a block different from a block rendering the system controller 10 realized with a microcomputer. Alternatively, an action as the image analysis/synthesis unit 12 may be realized by software to be invoked in the system controller 10.

An example of image synthesizing processing to be executed by the image analysis/synthesis unit 12 will be described later.

As components of the imaging device 1 that perform display for a user, a display unit 2 and the display control unit 7 are included.

The display unit 2 includes the display panel 2*a* formed with a liquid crystal panel or the like, and a display drive block that drives display of the display panel 2.

The display drive block is formed with a pixel drive circuit that displays image data, which is fed from the imaging control unit 6, on the display panel 2*a* that is, for example, a liquid crystal display. The pixel drive circuit applies a driving signal, which is based on a video signal, to each of pixels, which are arranged in the form of a matrix in the display panel 2*a*, at a predetermined horizontal/vertical driving timing, and thus allows the display panel 2*a* to execute display.

Under the control of the system controller 10, the display control unit 7 drives the pixel drive circuit in the display unit 2, and thus allows the display panel 2*a* to execute predetermined display.

Specifically, the display control unit allows the display panel 2*a* to execute display of the imaging unit 3 as an imaging monitor, reproduction and display of pickup image data fetched into the storage unit 14, display of data received by the communication unit 15, or display of various characters.

For the displays, for example, luminance level adjustment, color correction, contrast adjustment, or sharpness (contour enhancement) adjustment can be achieved. In addition, production of an enlarged image having part of image data enlarged, production of a reduced image, soft focus, production of a mosaic, luminance reversal, highlighted display (enhanced display) of part of an image, image effecting processing of changing the atmosphere of an overall color, separation or synthesis of images for piecewise display of a pickup image, production of a character image or a graphic image, and processing of synthesizing a produced image with a pickup image can be carried out.

The display control unit 7 may attain a see-through state (transparent state or translucent state) by controlling the display drive block on the basis of an instruction of the system controller 10, and controlling the transmittance of each of the pixels in the display panel 2*a*.

The storage unit 14 is used to preserve various kinds of data items, for example, is used to preserve pickup image data items and synthetic image data.

The storage unit 14 may be formed with a solid-state memory such as a RAM or a flash memory, or may be formed with, for example, a hard disk drive (HDD).

The storage unit 14 may not be a built-in recording medium but may be a recording/reproducing drive compatible with such a recording medium as a portable recording medium, for example, a memory card with a built-in solid-state memory, an optical disk, a magneto-optical disk, or a hologram memory.

Naturally, both a built-in type memory such as a solid-state memory or an HDD and a recording/reproducing drive compatible with a portable recording medium may be incorporated.

The storage unit 14 records or preserves pickup image data items and synthetic image data under the control of the system controller 10.

Under the control of the system controller 10, recorded data is read and fed to the system controller 10 and display control unit 7.

The communication unit 15 transmits or receives data to or from external equipment. The communication unit 15 may perform network communication through, for example, short-distance radiocommunication with a network access point by means of a wireless LAN or according to a protocol such as Bluetooth, or may perform radiocommunication directly with external equipment having a compatible communication function.

The communication unit 15 may not necessarily perform radiocommunication but may perform communication with external equipment through wired connection to the external equipment.

The imaging device 1 includes an operating input unit 11 for a user's operation of the imaging device.

The operating input unit 11 may include operating pieces, for example, keys and dials, and may sense a user's manipulation as a key manipulation or may sense a user's conscious behavior.

When the operating input unit 11 includes operating pieces, the operating pieces to be used to perform a manipulation of turning on or off a power supply, a manipulation on an imaging system (for example, a shutter release manipulation, a zooming manipulation, or a signal processing instructing manipulation), a display-related manipulation (for example, a manipulation of selecting a content to be displayed or a display adjusting manipulation) should be formed.

A touch pad or a touch panel may be included as operating pieces. For example, the touch panel is included in the display unit 2 so that when a user touches a display screen, manipulative entry will be performed.

As an operating piece to be used to move a pointer such as a cursor on a screen, the touch panel, a cross key, or a jog dial may be included. Otherwise, when a user holds and moves a remote controller with a built-in acceleration sensor or a built-in angular velocity sensor, a manipulation causing the cursor on the screen to move may be carried out.

For example, assuming that the imaging device like the one shown in section (c) or (d) of FIG. 1 is discussed, various manipulations should preferably be performed using operating keys, a dial, and a touch panel.

In the case of the imaging device to be mounted on the head like the one shown in section (a) or (b) of FIG. 1, operating keys, a dial, and a touch panel may be included. A form employing a remote controller is conceivable. In consideration of the difficulty in arranging numerous operating pieces, a constitution of sensing a user's behavior and regarding it as manipulative entry may be preferably adopted.

When the constitution of sensing a user's behavior is adopted, an acceleration sensor, an angular velocity sensor, a vibration sensor, or a pressure sensor is presumably included.

For example, the fact that a user has tapped the flank of the imaging device 1 is sensed by an acceleration sensor or a vibration sensor. For example, when an acceleration in a sideways direction exceeds a certain value, the system controller 10 recognizes the fact as a user's manipulation. If the acceleration sensor or angular velocity sensor is used to detect whether the user has tapped the right-hand part of the flank of the imaging device (part corresponding to one of the sidepieces of eyeglasses) or has tapped the left-hand part of the flank, the tapping may be recognized as a predetermined manipulation.

An acceleration sensor or an angular velocity sensor may be used to sense the fact that a user has turned or shaken his/her head, and the system controller 10 may recognize the turn or shake as a user's manipulation.

Assuming that a pressure sensor is disposed on each of the left-hand and right-hand parts of the flank of the imaging device 1 (parts equivalent to the sidepieces of eyeglasses), when a user depresses the right-hand part, it may be recognized as a zooming manipulation in a telephotographic direction. When the user depresses the left-hand part, it may be recognized as a zooming manipulation in a wide-angle direction.

Further, a component serving as a living-body sensor may be included, and living-body information on a user may be detected and recognized as manipulative entry. What is referred to as living-body information is a pulse rate, a heart rate, electrocardiogram information, electromyogram, respiratory information (for example, a speed of respiration, a depth thereof, or a breathing capacity), perspiration, electrodermal reaction (GSR), a blood pressure, a blood oxygen saturation concentration, a skin surface temperature, a brain wave (for example, information on an alpha wave, beta wave, theta wave, or delta wave), a change in a blood flow, or a state of eyes.

The system controller 10 recognizes information detected by the living-body sensor as user's manipulative entry. For example, a movement of eyes (a change in a line-of-sight direction or a blink) is conceivable as a user's conscious behavior. When the fact that the user blinks three times is sensed, it is decided as specific manipulative entry. Further, the fact that the user has worn the imaging device 1 or has taken off the imaging device 1, or the fact that a specific user has worn the imaging device 1 can be detected by sensing the living-body information. The system controller 10 may turn on or off the power supply according to the detection.

The living-body sensor may be incorporated in the mounting frame of, for example, the eyeglasses type imaging device 1, so that the living-body sensor can be brought into contact with the user's temporal part or occipital part in order to sense the foregoing various pieces of information. Otherwise, the living-body sensor may be separated from the mounting frame portion of the imaging device 1 so that the living-body sensor can be mounted on a specific part of a human body.

For detecting the state of eyes, a motion of the eyes, or the state of pupils, employment of a camera that images the eyes of a user is conceivable.

The operating input unit 11 feeds pieces of information, which are obtained by the operating pieces and the acceleration sensor, angular velocity sensor, vibration sensor, pressure sensor, or living-body sensor, to the system controller 10. The system controller 10 senses a user's manipulation on the basis of the pieces of information.

As a component that detects a user's behavior, a sensor that senses the user's voice, a sensor that senses the movements of the lips, or any other sensor may be included.

In the imaging device 1 of this example, the aforesaid touch panel manipulation, cursor moving manipulation, or user's behavior-based manipulation may be assigned to a shutter release manipulation, a manipulation of determining an object-of-synthesis area which is performed when manual handling is performed during synthesizing processing, or a manipulation of selecting any of frames juxtaposed on a time base as another frame to be synthesized.

The constitution of the imaging device 1 has been described so far. The constitution is a mere example. Addition or exclusion of various components dependent on an example of an action to be actually implemented or a function to be actually implemented is naturally conceivable.

Figure 3:
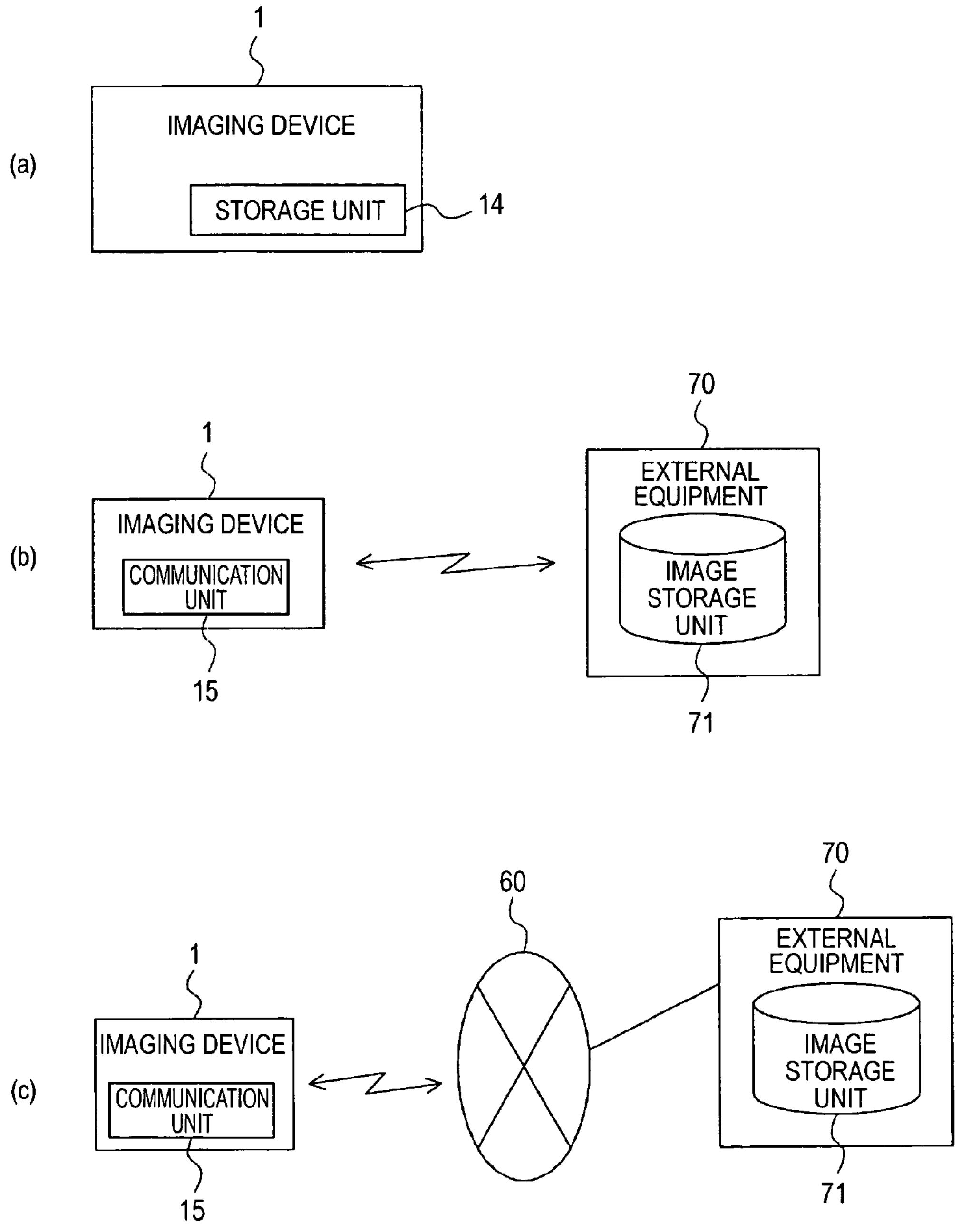
FIG. 3 includes explanatory diagrams of use forms of the imaging device of the embodiment.

FIG. 3 shows examples of operating forms of the imaging device 1 in relation to external equipment.

Section (a) of FIG. 3 is concerned with a case where the imaging device 1 operates solely. In this case, in the imaging device 1, pickup image data items of multiple frames acquired through an imaging action are used to perform image synthesizing processing. The pickup image data items of picked up multiple frames and synthetic image data produced by performing synthesizing processing are preserved as preserving processing in the storage unit 14.

When a reproduction unit compatible with a portable recording medium such as an optical disk or a memory card is included as the storage unit 14, pickup image data items read from the portable recording medium may be used to perform synthesizing processing.

Section (b) of FIG. 3 is concerned with a case where the imaging device 1 communicates with external equipment 70 using the communication unit 15. In this case, pickup image data items acquired through an imaging action are used to perform image synthesizing processing. In addition, the pickup image data items may presumably be acquired from the external equipment 70 and used for image synthesizing processing. For example, when the external equipment 70 is an imaging device or the external equipment 70 stores the pickup image data items picked up by another imaging device, the pickup image data items are transmitted from the external equipment 70 and received by the communication unit 15. The pickup image data items thus received by the communication unit 15 are used to perform image synthesizing processing.

As preserving processing of preserving synthetic image data produced through image synthesizing processing, the synthetic image data is stored in the internal storage unit 14 of the imaging device 1. In addition, an example of an action in which the synthetic image data is transmitted from the communication unit 15 to the external equipment and stored in an image storage unit 71 of the external equipment 70 is conceivable.

Communication with the external equipment 70 is not limited to radiocommunication but may presumably be wire communication.

Section (c) of FIG. 3 is concerned with a case where the communication unit 15 of the imaging device 1 has a communication access function for accessing a network 60 such as the Internet, and communicates with the external equipment 70 connected on the network 60. An example of an action is conceivably identical to that in the case of section (b) of FIG. 3.

What is referred to as the network 60 is conceivably, in addition to the Internet, a portable cellular phone communication network, a PHS communication network, an ad hoc network, a LAN, or any other network.

Figure 2:
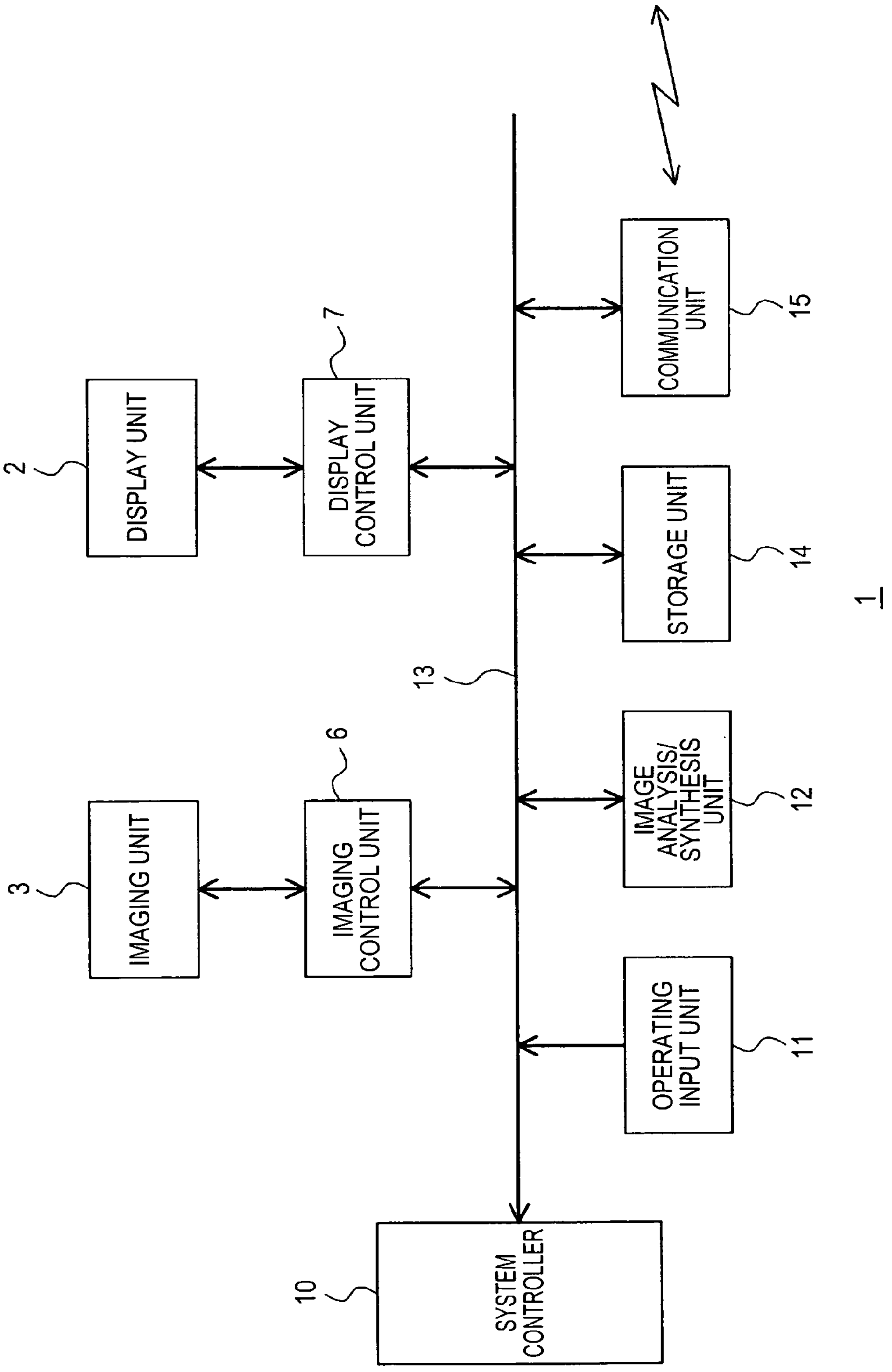
FIG. 2 is a block diagram of the imaging device of the embodiment.

What is referred to as the external equipment 70 in section (b) or (c) of FIG. 3 may presumably be another imaging device 1 having the constitution shown in FIG. 2, or may presumably be a data server having a communication function, a personal computer, a video player, a vide camera, a digital still camera, a portable cellular phone having an imaging function, a PDA, or any other equipment.

3. Image Synthesis and Preservation

Synthesizing processing to be performed in the image analysis/synthesis unit 12 will be described below.

As mentioned above, the image analysis/synthesis unit 12 uses pickup image data items of multiple frames to perform synthesizing processing. For example, the pickup image data items of multiple frames acquired by the continuous shutter release function of the imaging unit 3 are used as objects to perform synthesizing processing.

Figure 4:
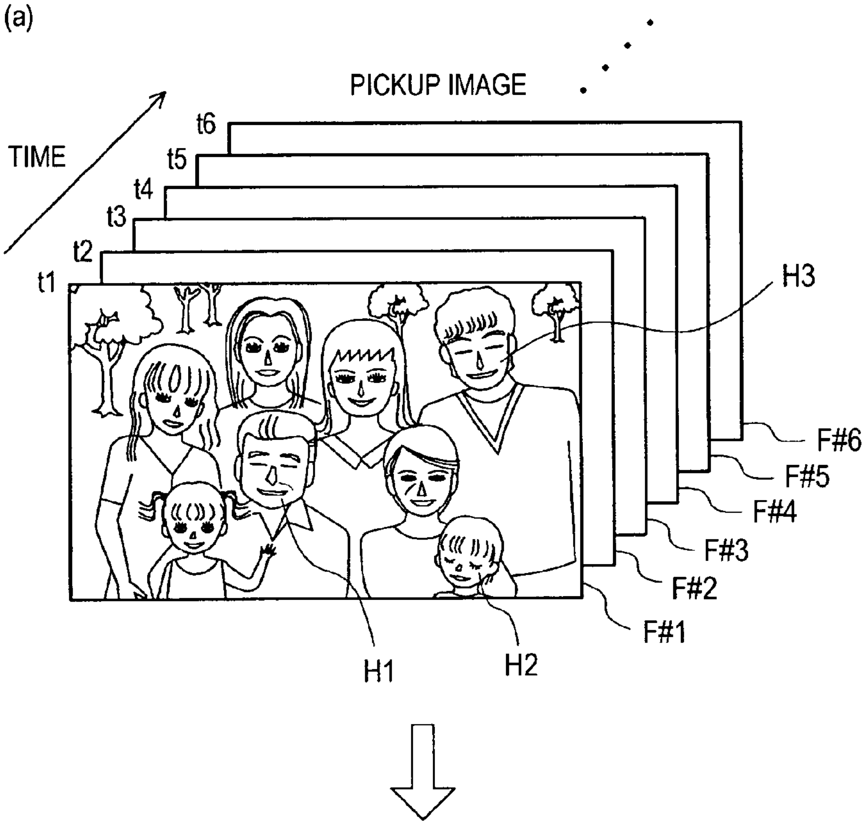
FIG. 4 includes explanatory diagrams of a synthetic image of the embodiment.
Figure 4:
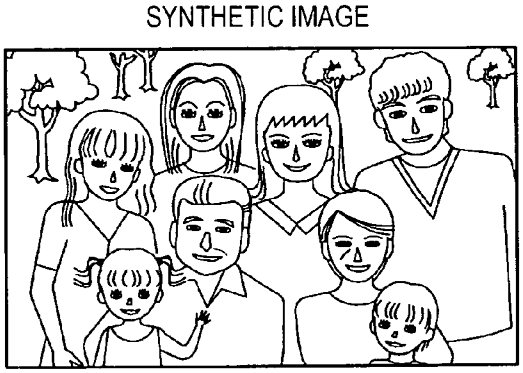

Section (a) of FIG. 4 shows multiple frames (F#1, F#2, F#3, etc.) as certain pickup image data items. This is a case where imaging for a group photograph is performed. The respective frames are frames fetched at different timings of time points t1, t2, t3, etc. For example, assume that the frames are frames picked up at intervals of several hundreds of milliseconds. For example, assume that a pickup image frame at the timing at which a user performs a shutter release manipulation is the frame F#1, and the frame F#2 and subsequent ones are then fetched at intervals of several hundreds of milliseconds.

As for the contents of a pickup image picked up as the frame F#1 shown in FIG. 4(*a*), three persons H1, H2, and H3 out of numerous people that are subjects have their eyes closed.

For example, when such an image is picked up, the frame F#1 is regarded as a synthesizing base image that is a reference image of synthesizing processing. Synthesis is performed to fit pixel data in the frame F#2 or subsequent one into an object-of-synthesis area determined in the synthesizing base image. As a result, a synthetic image like the one shown in section (b) of FIG. 4 is produced. The synthetic image in section (b) of FIG. 4 is an image in which all people that are subjects have their eyes left open.

Due to the blinks of the people who are subjects, the image of the frame F#1 fetched at the timing at which the user performs a shutter release manipulation shows people whose eyes are closed. In the other frames F#2, F#3, F#4, etc. picked up at intervals of several hundreds of milliseconds, there is a high possibility that the people whose eyes are closed in the frame F#1 may have their eyes left open.

Figure 5:
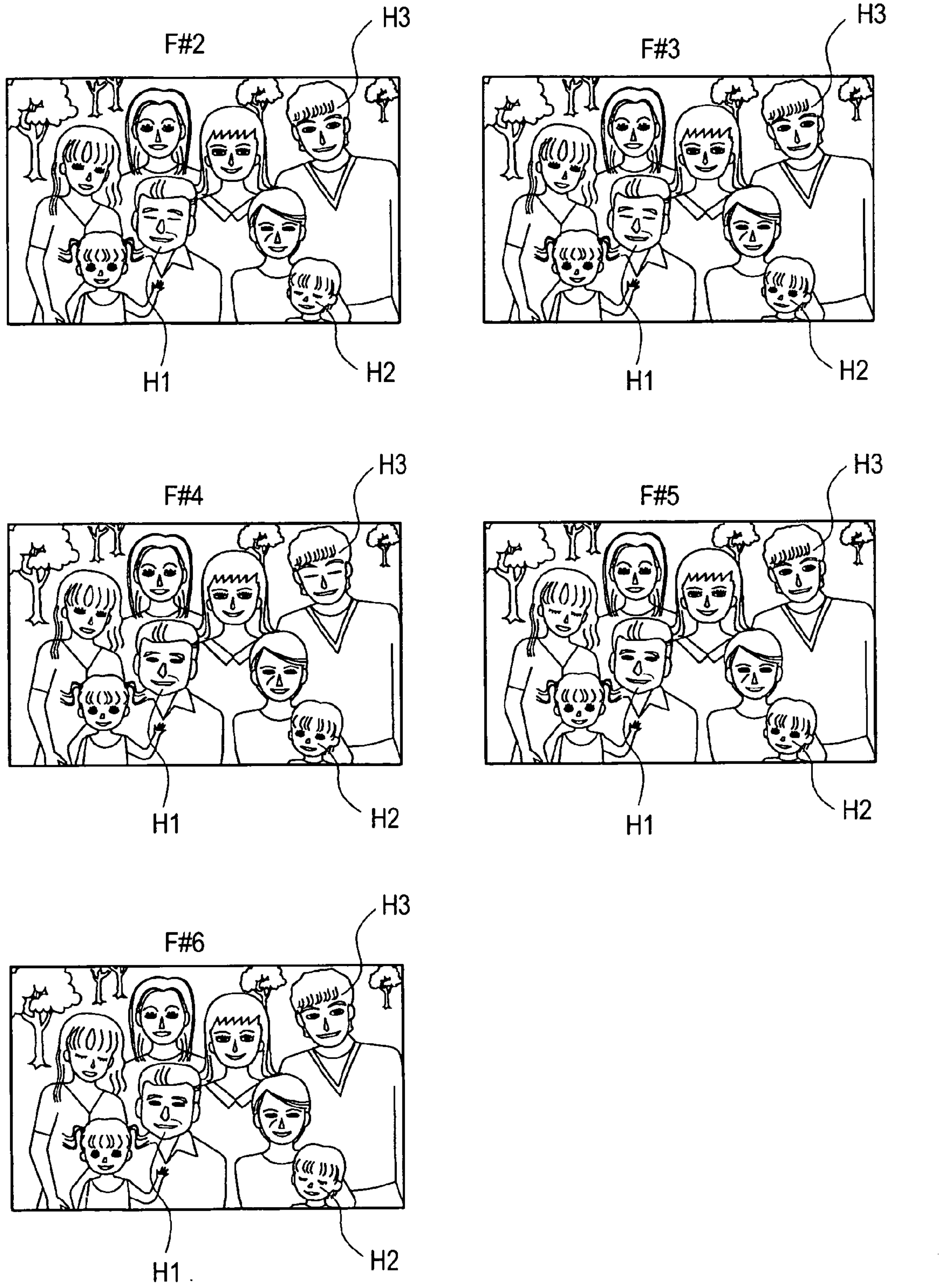
FIG. 5 includes explanatory diagrams of frame images to be used for synthesis of the embodiment.

FIG. 5 shows examples of images of the frames F#2, F#3, F#4, F#5, and F#6.

For example, a person H1 has his eyes left open in the images of the frames F#4, F#5, and F#6. A person H2 has his eyes left open in the images of the frames F#3, F#4, and F#5. A person H3 has his eyes left open in the images of the frames F#2, F#3, F#5, and F#6.

In this case, the facial image parts showing the persons H1, H2, and H3 who have their eyes closed in the image of the frame F#1 are regarded as object-of-synthesis areas, and are replaced with images in which the persons H1, H2, and H3 have their eyes left open.

For example, the part of the face of the person H1 is regarded as the first object-of-synthesis area, and pixel data in the area is replaced with pixel data in the frame F#4.

The part of the face of the person H2 is regarded as the second object-of-synthesis area, and pixel data in the area is replaced with pixel data in the frame F#3.

The part of the face of the person H3 is regarded as the third object-of-synthesis area, and pixel data in the area is replaced with pixel data in the frame F#2.

Thus, the facial images of the persons H1, H2, and H3 in the image of the frame F#1 are replaced with the images in which the eyes of the persons are left open, and a synthetic image in which all the people have their eyes left open can be produced as shown in section (b) of FIG. 4.

A frame from which pixel data to be replaced is extracted should preferably be a frame temporally close to the frame F#1 that is the synthesizing base image. This is intended to diminish the difference in the inside or outside of an object-of-synthesis area between images as greatly as possible.

Figure 6:
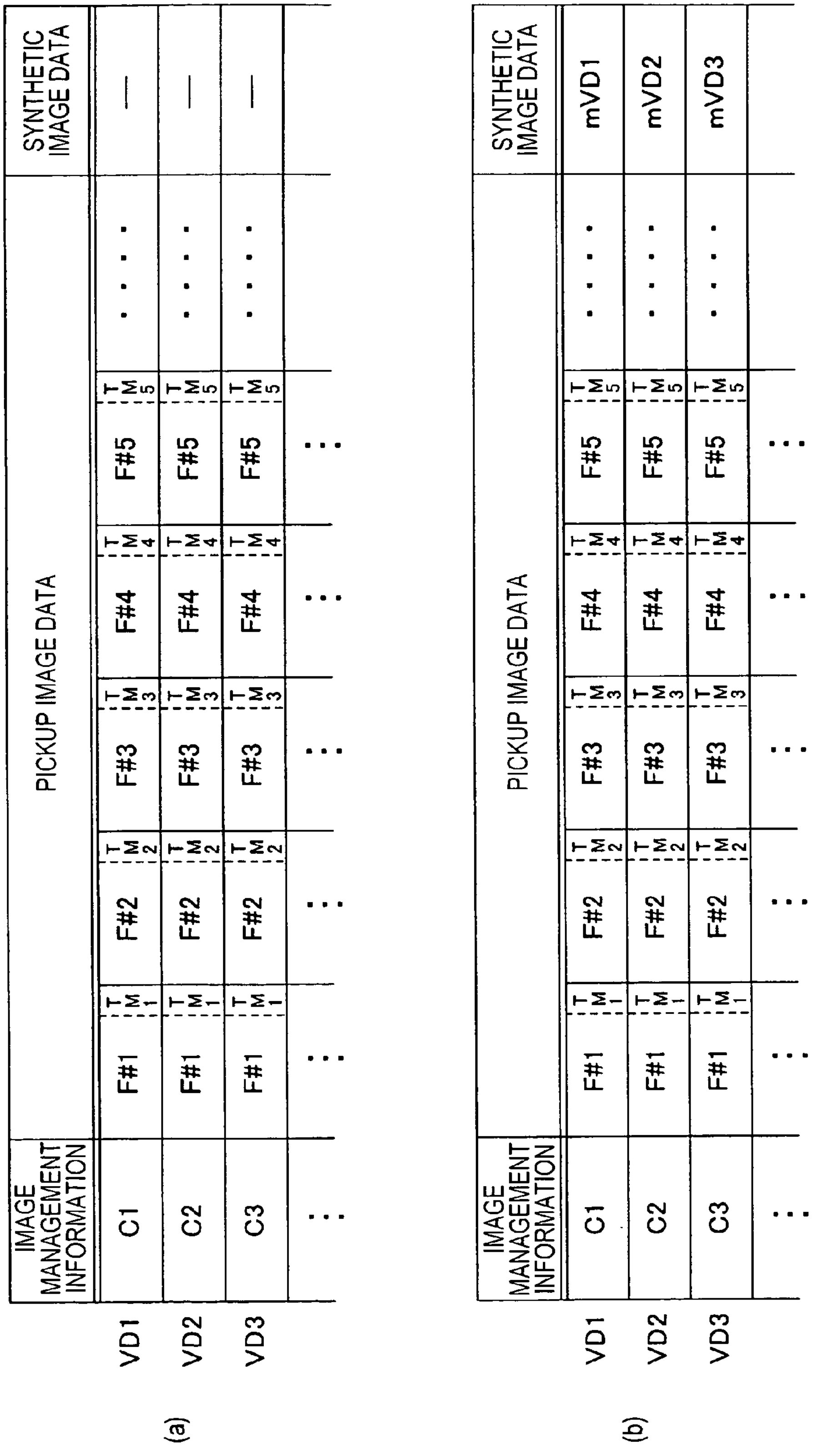
FIG. 6 includes explanatory diagrams of preserved states of pickup image data items and synthetic image data items of the embodiment.

FIG. 6 illustratively shows the images-preserved states of the storage unit 14 attained before and after synthesizing processing.

For example, every time the imaging unit 3 performs an imaging action, pickup image data items VD1, VD2, VD3, etc. are recorded in the storage unit 14.

Talking of the pickup image data VD1, image management information C1 and pickup image data items of multiple frames F#1, F#2, F#3, etc. are preserved.

The image management information C1 contains, for example, a filename of pickup image data, an image type (a motion picture or a still image), a data size, a compression method, date information, and identification information of a device having performed imaging.

In the pickup image data items of multiple frames F#1, F#2, F#3, etc., time difference information TM is contained. For example, the leading frame F#1 is regarded as a reference, and a time difference from the leading frame F#1 to the imaging timing of the frame F#2 or subsequent one is regarded as the time difference information TM. For example, assuming that a frame is fetched at intervals of 0.4 sec, the time difference information TM1 on the frame F#1 is 0 sec, the time difference information TM2 on the frame F#2 is +0.4 sec, the time difference information TM3 on the frame F#3 is +0.8 sec, and the time difference information TM4 on the frame F#4 is +1.2 sec. Incidentally, the time difference information TM may be information on an actual time instant of frame fetching (year/month/day/hour/min/sec/frame).

For example, when imaging is performed once in order to acquire the pickup image data VD1, the system controller 10 produces the image management information concerning the pickup image data VD1, appends the pieces of time difference information TM1 TM2, TM3, etc. to the multiple frames F#1, F#2, F#3, etc. of pickup image data items, and stores the pieces of information in the storage unit 14.

By performing the foregoing action for every still-image pickup, pickup image data items of multiple frames are recorded as each of pickup image data items VD2, VD3, etc. in the same manner.

Incidentally, pickup image data items of multiple frames are not always derived from continuous imaging performed by the imaging unit 3 but may be multiple frames received by the communication unit 15 or multiple frames read from a portable recording medium.

After one frame or multiple frames are fetched through imaging, a frame received by the communication unit 15 or read from a portable recording medium may be added. For example, after one frame F#1 is fetched as the pickup image data VD1, a frame image received or reproduced may be recorded as the frame F#2 or a subsequent frame contained in the pickup image data VD1.

Assuming that the pickup image data VD1 represents images shown in section (a) of FIG. 4, the multiple frames F#1, F#2, etc. recorded as the pickup image data VD1 as shown in section (a) of FIG. 6 are image data items representing the contents shown in section (a) of FIG. 4 and FIG. 5.

The image analysis/synthesis unit 12 uses the frames F#1, F#2, etc., which are recorded in the storage unit 14, to perform synthesizing processing as mentioned above, and produces the synthetic image data shown in, for example, section (b) of FIG. 4. After the synthetic image data is produced, the system controller 10 preserves the data as synthetic image data mVD1 associated with the pickup image data VD1 in the storage unit 14.

Section (b) of FIG. 6 shows a situation in which the synthetic image data mVD1 is preserved in association with the pickup image data VD (F#1, F#2, etc.) in the storage unit 14.

Synthetic image data mVD2 associated with the pickup image data VD2 and synthetic image data mVD3 associated with the pickup image data VD3 are shown to be produced and stored.

Since the synthetic image data mVD is preserved as mentioned above, the synthetic image data mVD can be displayed or outputted on or to the display unit 2.

After the synthetic image data mVD is recorded in the storage unit 14, the original pickup image data items of multiple frames F#1, F#2, etc. may be deleted or may not be deleted but may be preserved as they are. When the original pickup image data items are preserved, another synthetic image data mVD may be produced.

An example of preservation in the storage unit 14 has been described. As preserving processing, the processing of transmitting or outputting the synthetic image data mVD from the communication unit 15 may be carried out. In the form shown in section (b) or (c) of FIG. 3, the synthetic image data mVD may conceivably be preserved in the image storage unit 71 of the external equipment 70.

Incidentally, the synthesizing processing described in conjunction with FIG. 4 and FIG. 5 is concerned with an example in which all the people of subjects appear to have their eyes left open. Other numerous pieces of synthesizing processing are presumed.

FIG. 7, FIG. 8, FIG. 9, and FIG. 10 show examples.

Figure 7:
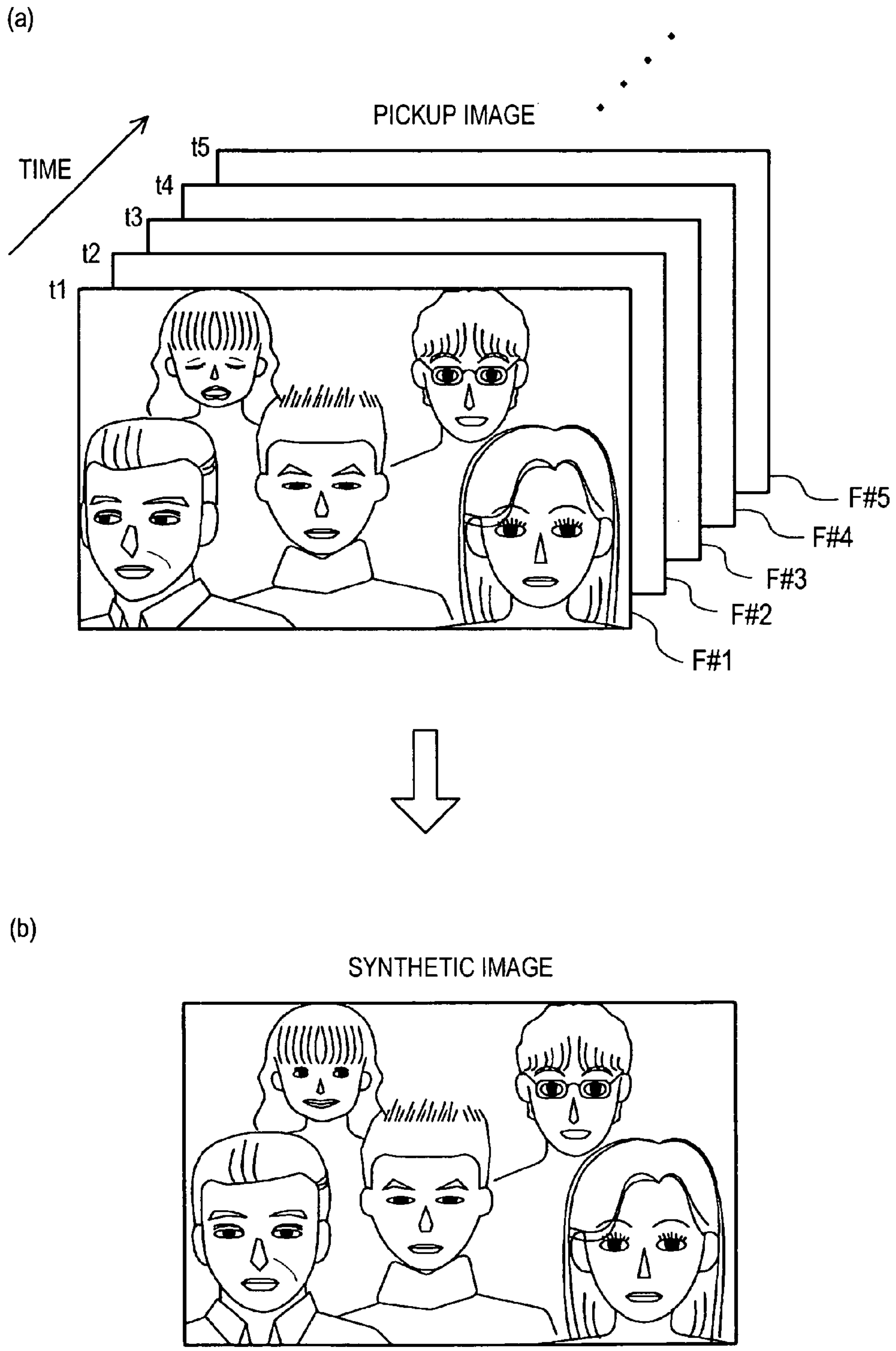
FIG. 7 includes explanatory diagrams of a synthetic image of the embodiment.

Section (a) of FIG. 7 shows multiple frames (F#1, F#2, F#3, etc.) as certain pickup image data items. This is concerned with a case where five people are photographically imaged. The frames shall be picked up at intervals of, for example, several hundreds of milliseconds.

As for the contents of the image of the frame F#1 shown in section (a) of FIG. 7, the image is an image obtained the instant the leftmost person on the front row has turned sideways. In addition, in the image, the left-hand person on the back row appears to have a peculiar expression.

In this case, the parts of the faces of the persons are regarded as object-of-synthesis areas, and the pixel data items in the object-of-synthesis areas are searched from the other frames F#2, F#3, etc. in order to perform synthesis. Thus, an image in which all the people appear to look to the front and have soft expressions is produced as shown in, for example, section (b) of FIG. 7.

Figure 8:
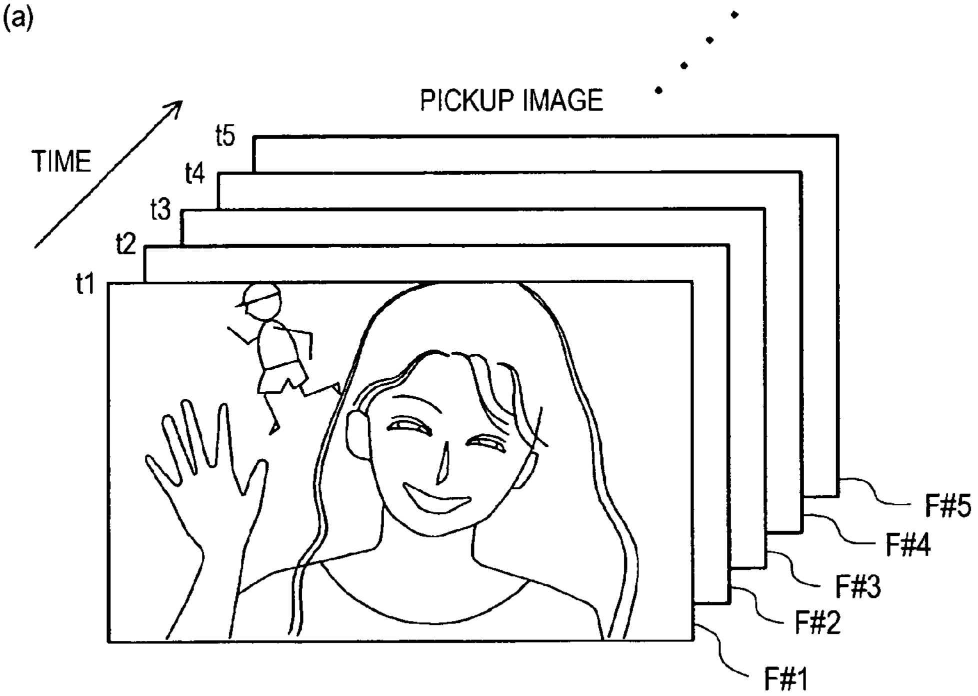
FIG. 8 includes explanatory diagrams of a synthetic image of the embodiment.
Figure 8:
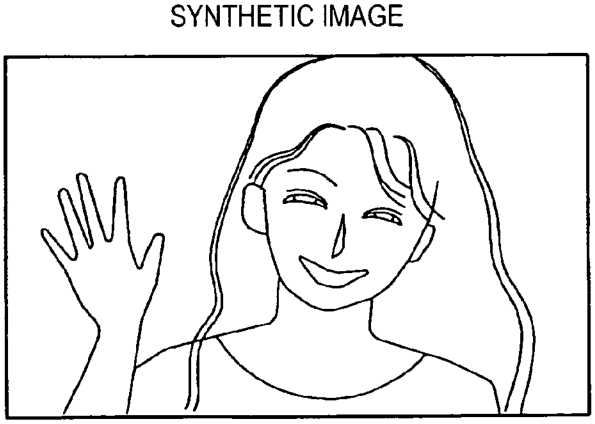

Section (a) of FIG. 8 shows multiple frames (F#1, F#2, F#3, etc.) as pickup image data items obtained with one person regarded as a subject. As for the contents of the image of the frame F#1 shown in section (a) of FIG. 8, the image is an image in which an unrelated person appears in the background.

For example, the part of the unrelated person is regarded as an object-of-synthesis area, and an image in which the person does not appear is searched from among the other frames F#2, F#3, etc., and synthesized. Thus, an image in which only an intended person appears can be produced as shown in section (b) of FIG. 8.

Figure 9:
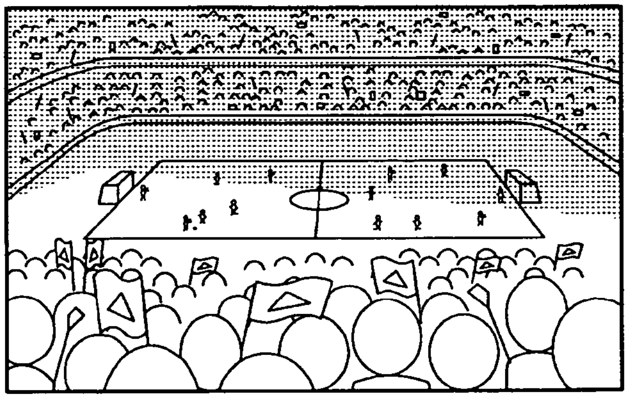
FIG. 9 includes explanatory diagrams of a synthetic image of the embodiment.
Figure 9:
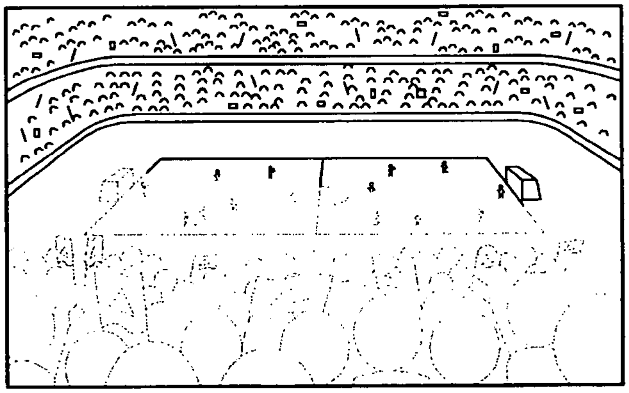
Figure 9:
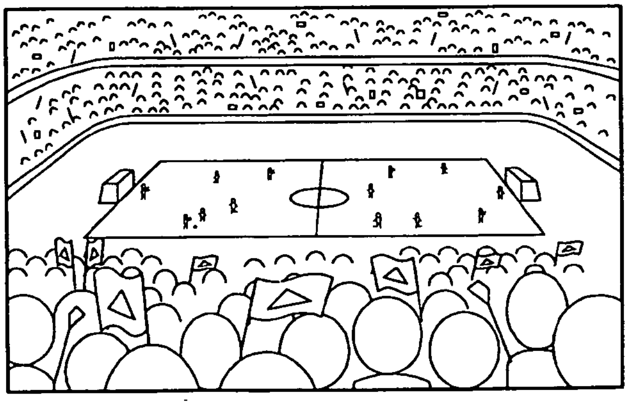

Section (a) of FIG. 9 shows as certain pickup image data a state in which a light and a dark are separated from each other in an image due to the adverse effect of the sunshine and shadow. In this case, the upper half of the image is an image that shows the shadow, is low in brightness, and is hard to see. The lower half of the image has a satisfactory brightness.

In contrast, section (b) of FIG. 9 is an image obtained when imaging is performed with an imaging sensitivity raised. Contrary to section (a) of FIG. 9, the upper half of the image has a satisfactory brightness. However, since the sensitivity is raised, the lower half of the image is an image that is excessively bright and is hard to see.

During continuous imaging to be performed at intervals of, for example, one sec, imaging is performed by varying the sensitivity in order to fetch multiple frames. Thus, the frames include the images like the ones shown in sections (a) and (b) of FIG. 9.

In this case, the frame shown in section (a) of FIG. 9 is regarded as a synthesizing base image, and the upper-half shadow part is regarded as an object-of-synthesis area. Synthesizing processing of replacing the pixel data in the object-of-synthesis area with pixel data in the frame shown in section (b) of FIG. 9 is carried out, whereby synthetic image data representing a screen whose entire surface exhibits an appropriate brightness is obtained as shown in section (c) of FIG. 9.

Figure 10:
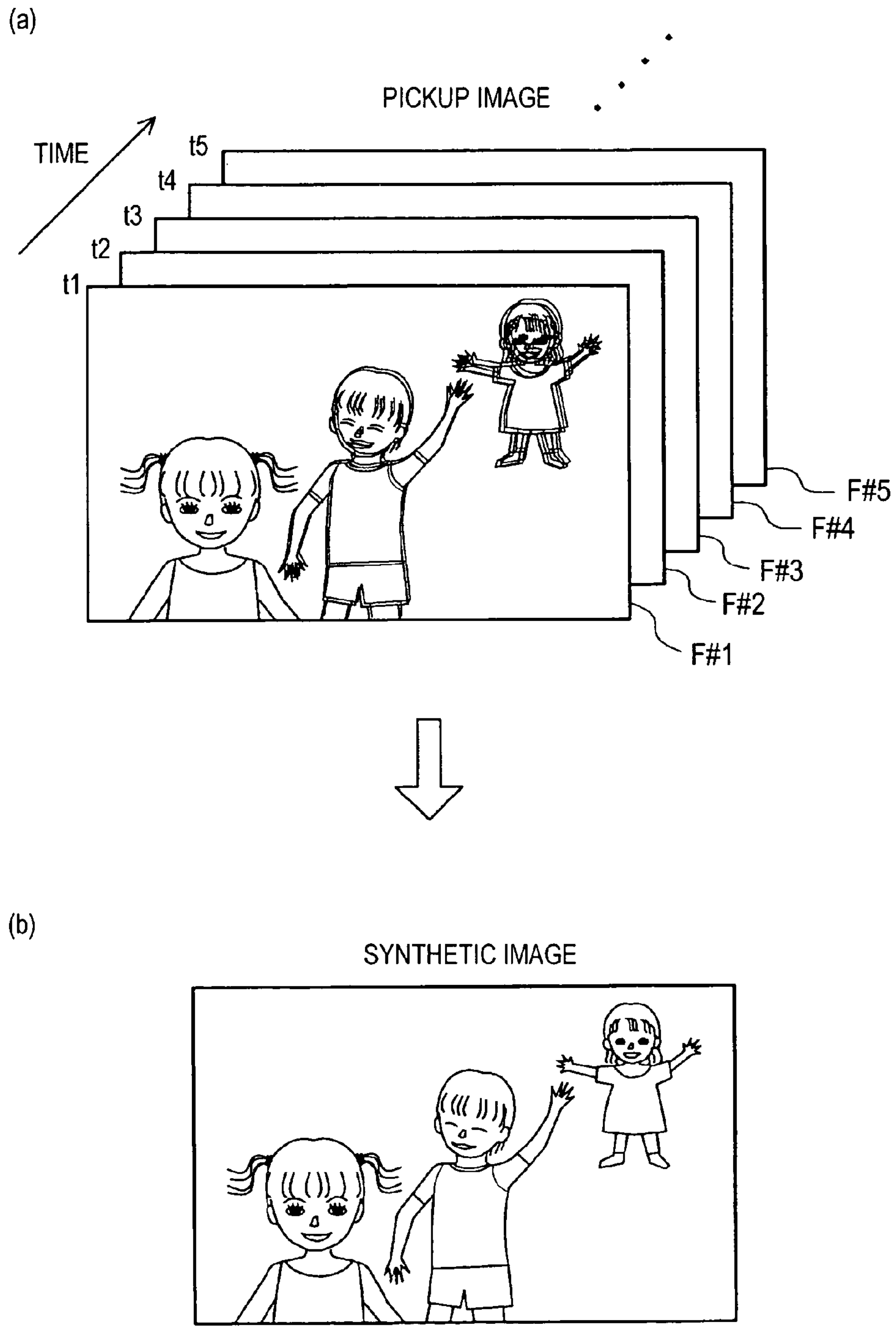
FIG. 10 includes explanatory diagrams of a synthetic image of the embodiment.

Section (a) of FIG. 10 shows multiple frames (F#1, F#2, F#3, etc.) as pickup image data items obtained when multiple people lying at different distances from the position of the imaging device 1 are regarded as subjects. As for the contents of the image of the frame F#1 shown in section (a) of FIG. 10, a person lying at the nearest position (the left-hand side of the image) is focused, but the other people lying at separate positions appears as a blurred image because of an unmatched focal length.

When the multiple frames (F#1, F#2, F#3, etc.) are picked up, if the imaging unit 3 attempts to gradually change focal lengths, an image in which the person in the middle is focused is obtained as a certain frame and an image in which the right-hand person is focused is obtained as another certain frame.

In this case, the frame shown in section (a) of FIG. 10 is regarded as a synthesizing base image, and an area in which the subject appears blurred is regarded as an object-of-synthesis area. Synthesizing processing of replacing the pixel data in the object-of-synthesis area with the pixel data in any other frame in which the area does not appear blurred is carried out. Thus, as shown in section (b) of FIG. 10, excellent synthetic image data representing an image in which all the people lying at different distances do not appear blurred can be obtained.

Needless to say, numerous pieces of synthesizing processing other than the foregoing examples can be carried out.

4. Image Synthesizing Processing

Figure 11:
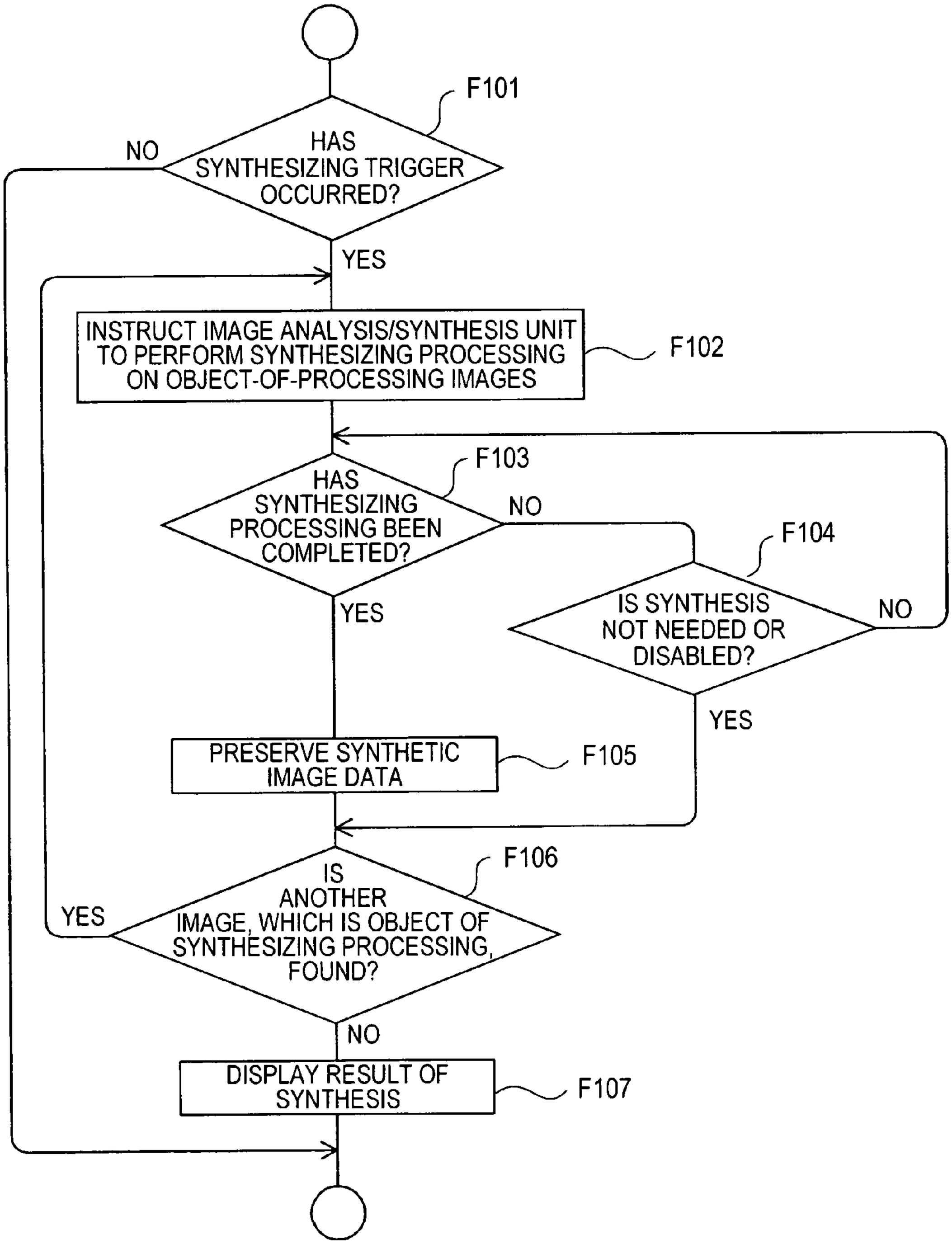
FIG. 11 is a flowchart of processing to be performed by a system controller of the embodiment.
Figure 12:
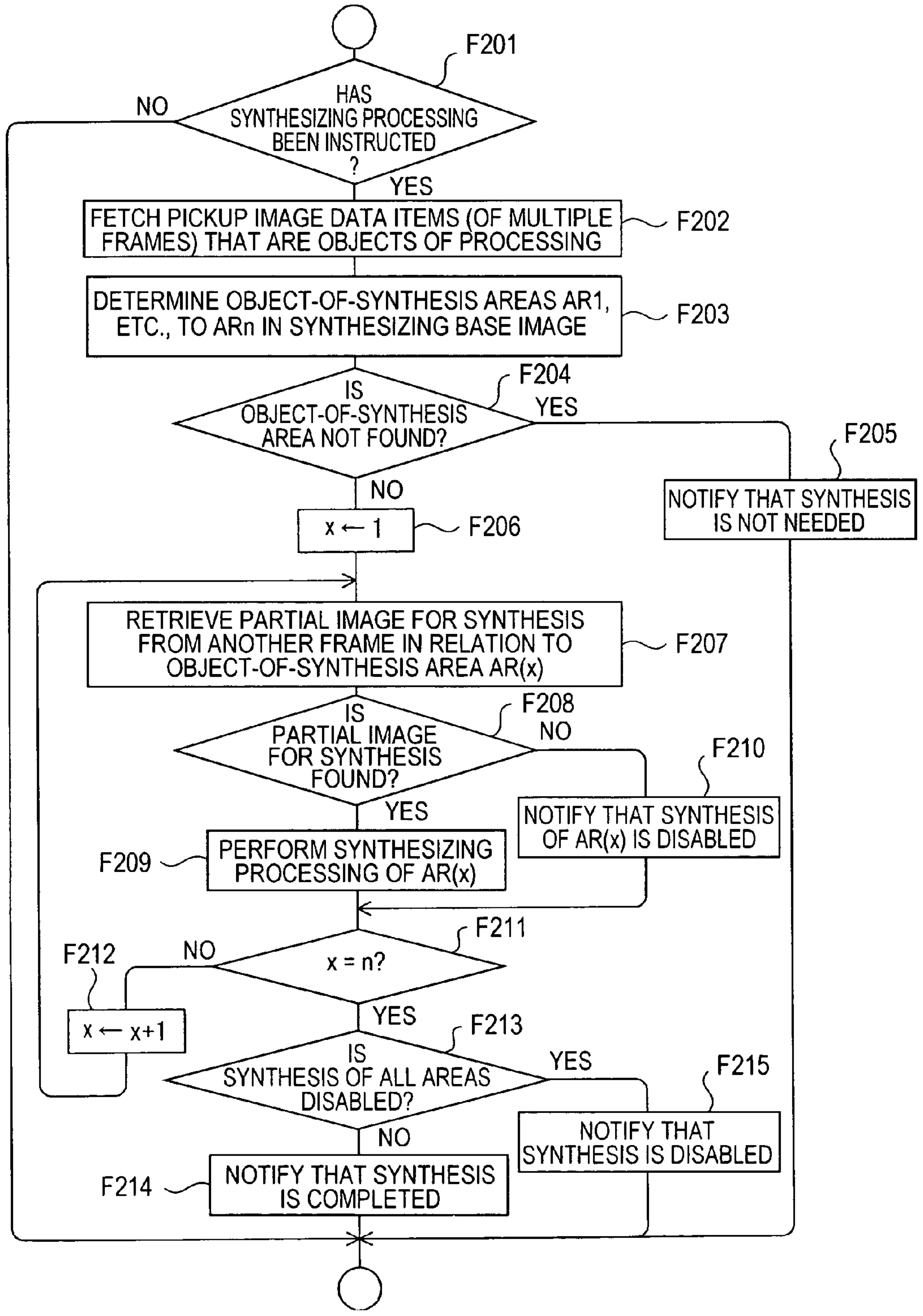
FIG. 12 is a flowchart of synthesizing processing to be performed by an image analysis/synthesis unit of the embodiment.

FIG. 11 and FIG. 12 show the processing of the system controller 10 and the processing of the image analysis/synthesis unit 12 respectively which are intended to perform the foregoing image synthesis.

To begin with, the processing of the system controller 10 will be described in conjunction with FIG. 11.

The system controller 10 checks occurrence of a synthesizing trigger at step F101. The system controller 10 recognizes some signal or an acting state, which is generated when synthesizing processing is initiated in the imaging device 1, as occurrence of a synthesizing trigger.

For example, when certain pickup image data recorded as shown in section (a) of FIG. 6 is displayed or outputted on or to the display unit 2, if a user performs a synthesizing processing manipulation, the system controller 10 recognizes occurrence of a synthesizing trigger.

What is referred to as display of pickup image data in a situation of preservation like the one shown in section (a) of FIG. 6 is, for example, to display the pickup image data of the leading frame F#1 as the pickup image data VD. Every time a user performs a shutter release manipulation, imaging processing is carried out and pickup image data items VD1, VD2, etc. are preserved. In this case, multiple frames are fetched during one imaging. At this time, for example, assume that the leading frame F#1 is image data obtained at the shutter release timing at which the user performs the manipulation, and the frame F#2 and subsequent frames are image data items fetched at intervals of a predetermined time after the shutter release timing. In this case, the image data of the frame F#1 is regarded as basic pickup image data. Therefore, when a manipulation of requesting display is performed in order to perform monitoring immediately after imaging or perform monitoring of pickup images preserved by the user, the image data of the frame F#1 is displayed as each of the pickup image data items VD1, VD2, etc.

When certain pickup image data VD is displayed, if a user performs a manipulation of instructing synthesizing processing, the synthesizing processing for the pickup image data VD is initiated.

When listing the preserved pickup image data items VD1, VD2, etc. is executed, if a user performs a manipulation for synthesizing processing by designating one pickup image data or multiple pickup image data items through manipulative entry, the system controller 10 recognizes it as occurrence of a synthesizing trigger, and initiates the synthesizing processing for the designated one pickup image data VD or multiple pickup image data items VD.

When synthesizing processing is instructed for all preserved pickup image data items VD1, VD2, etc. through user manipulation, the system controller 10 recognizes it as occurrence of a synthesizing trigger, and initiates the synthesizing processing for all the pickup image data items VD.

Further, synthesizing processing is conceivably automatically executed during imaging. For example, when the frames F#1, F#2, etc. are fetched as pickup image data VD1, the system controller 10 recognizes it as occurrence of a synthesizing trigger, and autonomously proceeds to the synthesizing processing using the frames F#1, F#2, etc. This example of an action is conceivable.

When the communication unit 15 receives pickup image data items (pickup image data items of multiple frames picked up by another imaging device) transmitted from the external equipment 70 in the form shown in section (b) or (c) of FIG. 3, or when pickup image data items of multiple frames are reproduced from a portable recording medium that is provided with a recording/reproducing drive, the system controller 10 recognizes it as occurrence of a synthesizing trigger, and proceeds to the synthesizing processing employing the acquired pickup image data items of multiple frames. This example of an action is also conceivable.

Further, when a living-body sensor is included as mentioned previously, a synthesizing trigger may be identified based on user's subjective assessment. For example, a user satisfaction level with a pickup image is estimated from a brain wave or the like detected when the pickup image data is displayed and thus presented to the user. If the user is estimated to feel dissatisfied, the system controller 10 recognizes it as occurrence of a synthesizing trigger and proceeds to the synthesizing processing for the pickup image data. This example of an action is also conceivable.

If occurrence of a synthesizing trigger is recognized as any of the foregoing various situations, the system controller 10 advances processing from step F101 to step F102 and instructs the image analysis/synthesis unit 12 to execute synthesizing processing for object-of-processing images.

For example, when synthesizing processing is performed on one pickup image data VD or multiple pickup image data items VD responsively to the aforesaid user manipulation or imaging action, the system controller 10 designates one pickup image data VD out of one object of processing or multiple objects of processing at step F102, and instructs the image analysis/synthesis unit 12 to execute the synthesizing processing.

In response to the instruction made at step F102, the image analysis/synthesis unit 12 executes image synthesizing processing to be described later in conjunction with FIG. 12.

After instructing the image analysis/synthesis unit 12 to initiate synthesizing processing, the system controller 10 verifies at step F103 whether the synthesizing processing of the image analysis/synthesis unit 12 has been completed. At step F104, the system controller 10 verifies whether the image analysis/synthesis unit 12 has notified that the synthesizing processing is not needed or disabled.

If the image analysis/synthesis unit 12 has notified that the synthesizing processing has been completed, the system controller 10 advances processing from step F103 to step F105, and performs control processing intended to preserve produced synthetic image data. Namely, as described in conjunction with section (b) of FIG. 6, the produced synthetic image data mVD is transferred to the storage unit 14 and recorded therein. Otherwise, control is extended so that the produced synthetic image data mVD will be transmitted from the communication unit 15 to the external equipment 70 and then will be preserved in the external equipment 70.

After preservation control of the synthetic image data mVD is carried out, processing proceeds to step F106. If the notification that synthesis is not needed or disabled is received, processing proceeds from step F104 to step F106.

At step F106, the system controller 10 verifies whether another pickup image data VD that is an object of synthesizing processing is found. When synthesizing processing is initiated with multiple pickup image data items VD as objects of processing, if processing of all the pickup image data items VD that are the objects of processing has not been completed, the processing is returned to step F102. The processing from step F102 to step F105 is performed on the next pickup image data VD in the same manner.

After the processing from step F102 to step F105 is completed for all the pickup image data items VD that are the objects of processing, the processing proceeds to step F107. The result of synthesis is displayed on the display unit 2, and the synthesizing processing is terminated. For example, as the result of synthesis, Synthesis Completed, Synthesis Not Needed, or Synthesis Disabled is presented to a user in relation to pickup image data VD that is an object. Otherwise, the processing of displaying produced synthetic image data mVD is carried out.

Next, synthesizing processing to be executed by the image analysis/synthesis unit 12 in response to an instruction sent from the system controller 10 will be described in conjunction with FIG. 12.

In response to the instruction of synthesizing processing sent from the system controller 10 at step F102 in FIG. 11, the image analysis/synthesis unit 12 advances the processing described in FIG. 12 from step F201 to step F202, and initiates image synthesizing processing.

At step F202, the image analysis/synthesis unit 12 fetches pickup image data VD that is an object of processing and is instructed by the system controller 10. For example, when pickup image data items are recorded in the storage unit 14 as shown in section (a) of FIG. 6, if the pickup image data VD1 is instructed as an object of processing, the frames F#1, F#2, F#3, etc. contained in the pickup image data VD1 are fetched.

At step F203, the image analysis/synthesis unit 12 designates one of the fetched pickup image data items of multiple frames as a synthesizing base image, and determines one object-of-synthesis area or multiple object-of-synthesis areas AR (AR1 to ARn) in the synthesizing base image.

As for designation of which of multiple frames as a synthesizing base image, either automatic designation or manual designation based on a user's manipulation is conceivable.

As for automatic designation, for example, the frame F#1 that temporally leads is designated. However, a temporally intermediate frame out of multiple frames may be regarded as a synthesizing base image, or a temporally terminal frame may be regarded as the synthesizing base image. Naturally, any other frame may be selected. A frame may not be designated under the condition that the frame should temporally precede or succeed but may be designated based on an imaging parameter or the like. For example, when multiple frames are picked up, if the frames are picked up by varying a certain imaging parameter (for example, a sensitivity, a parameter for luminance processing or color processing, or a focal length), a frame picked up with the parameter set to an intermediate value is regarded as the synthesizing base image.

As for manual designation, for example, a technique of sequentially displaying or outputting the frames F#1, F#2, F#3, etc. on or to the display unit 2, or listing the frames with thumbnail images, and prompting a user to select one of the frames is presumed.

After a synthesizing base image is selected, an object-of-synthesis area is determined in the synthesizing base image. For example, FIG. 13 and FIG. 14 show examples of the determined object-of-synthesis area.

Figure 13:
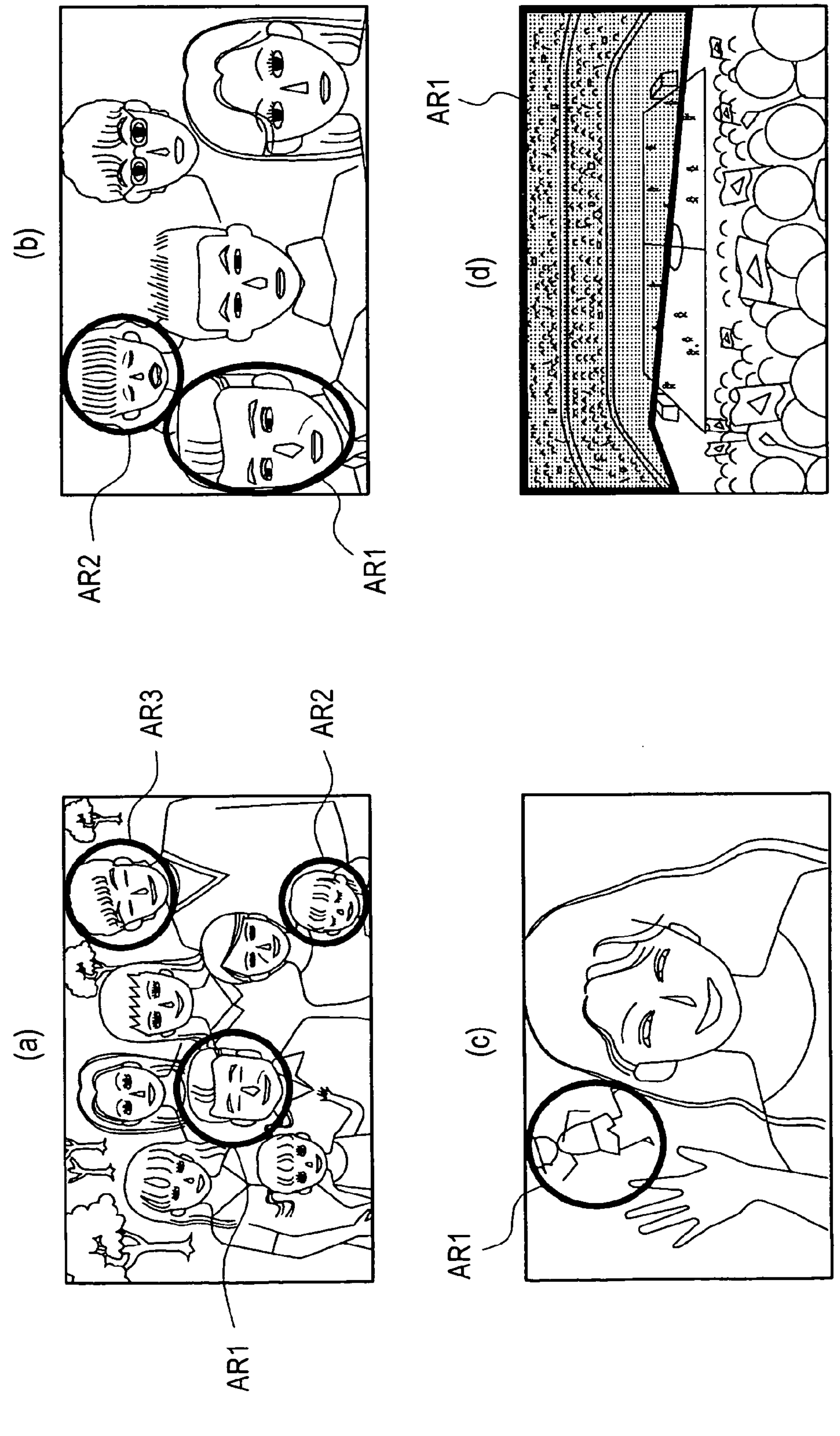
FIG. 13 includes explanatory diagrams concerning designation of an object-of-synthesis area of the embodiment.
Figure 14:
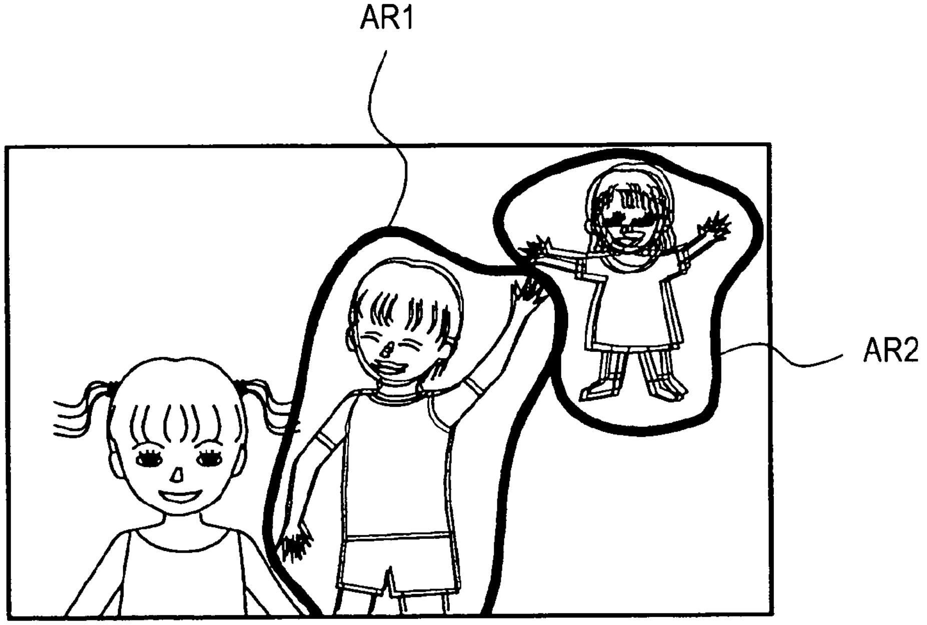
FIG. 14 is an explanatory diagram concerning designation of an object-of-synthesis area of the embodiment.

Sections (a), (b), (c), and (d) of FIG. 13 and FIG. 14 show examples of an image of a certain frame regarded as a synthesizing base image.

Section (a) of FIG. 13 shows an image that is a group photograph and is an example in which facial areas representing persons whose eyes are closed are designated as object-of-synthesis areas AR1, AR2, and AR3 respectively.

Section (b) of FIG. 13 shows an image that shows five people and that is an example in which a facial area representing a person who has turned sideways and a facial area representing a person who has a peculiar expression are designated as object-of-synthesis areas AR1 and AR2 respectively.

Section (c) of FIG. 13 shows an example in which an unrelated person appears in an image and an area representing the unrelated person is designated as an object-of-synthesis area AR1.

Section (d) of FIG. 13 shows an example in which the brightness of an image greatly varies and an area whose brightness is low (area representing the shadow) is designated as an object-of-synthesis area AR1.

FIG. 14 shows an image that shows multiple people and that is an example in which areas representing persons who are out of focus are designated as object-of-synthesis areas AR1 and AR2 respectively.

An object-of-synthesis area is designated as mentioned above. The designating processing presumably falls into automatic designation and manual designation.

As for automatic designation, cases described below are, for example, presented.

Image analysis is performed on a synthesizing base image in order to decide whether a human face appears in the image. If one human face or multiple human faces appear, whether the person has his/her eyes left open (whether the eyes can be detected) is detected. If a facial image in which the person has his/her eyes closed (the eyes cannot be detected) is found, an area of the facial image is regarded as an object-of-synthesis area. This processing makes it possible to designate object-of-synthesis areas like those in section (a) of FIG. 13.

If a line-of-sight direction or a facial expression can be recognized through image analysis, an area of a facial image in which a line of sight is not directed to the front or an area of a facial image that does not represent a smile or a natural expression is detected and regarded as an object-of-synthesis area. Thus, the designation like the one of the areas shown in section (b) of FIG. 13 can be achieved.

Various pieces of processing are conceivable for discriminating a facial expression. For example, a technique of extracting parts that constitute a face, assigning scores to the respective parts, and discriminating the facial expression may be adopted.

For example, for discriminating a smile, portions of the eyes, eyebrows, and lips are extracted from an image as parts constituting a face. For example, as for the eyebrows, the angle of the eyebrows is discriminated. A so-called "raised" state is associated with a low point. As the ends of the eyebrows fall more greatly, a higher point is assigned. As for the eyes, the degree of openness of the pupils is discriminated. As the pupils are open more greatly, a higher point is assigned. As for the lips, as the ends of the lips fall more greatly, a lower point is assigned. As the ends of the lips rise more greatly, a higher point is assigned.

For example, a point for smile discrimination is assigned to each of the parts. The points are added up (or the points are weighted mutually differently and then added up) in order to calculate a smile point. As the smile point is higher, a "softer expression" is discriminated.

Naturally, this is a mere example. The state of the cheeks or wrinkles generated when a person smiles may be adopted as a criterion.

Aside from smile discrimination, any other expression such as an angry expression or an unpleasant expression may be inferred from images of parts constituting a face.

If an unrelated person is included as a subject, the unrelated person can be detected.

For example, when a facial image is detected in a synthesizing base image, if an image in which a face cannot be detected at the same position is included in the preceding and succeeding frames, the person can be estimated as a person who has passed behind during imaging. In particular, when a facial area lies away from the center of an image (for example, outside a ½ point from the center of the image), if an image in which a face cannot be detected at the same position is included in the images of frames preceding and succeeding the synthesizing base image, there is a high possibility that the person may be an unrelated person.

Assuming that a facial image is detected in a synthesizing base image and the area of the facial area or the length of the diagonal line thereof is sufficiently small, if an image in which a face cannot be detected at the same position is included in the images of frames preceding and succeeding the synthesizing base image, there is a high possibility that the person is an unrelated person. When it says that the facial area or the length of diagonal line is sufficiently small, it means that the facial area or the length is equal to or smaller than a 1/10 of the area of the entire image or the length of the diagonal line of the image.

When multiple facial images are found in a synthesizing base image, if an area of a facial image of a certain person is sufficiently smaller than areas of facial images of the other persons, the person can be estimated as a person who is unexpectedly imaged in the background. The facial image is equal to or smaller than, for example, a ½ of a maximum facial area in an image. Even in this case, if an image in which a face cannot be detected at the same position is included in the images of frames preceding and succeeding the synthesizing base image, there is a high possibility that the person is an unrelated person.

Through, for example, the foregoing processing, an unrelated person can be automatically discriminated, and an object-of-synthesis area like the one shown in section (c) of FIG. 13 can be designated.

When a difference in light intensity, in luminance, or in shade is detected in a synthesizing base image, if an area exhibiting a marked difference is found, the area may be regarded as an object-of-synthesis area. Thus, an object-of-synthesis area like the one shown in section (d) of FIG. 13 can be designated.

The presence of a partly blurred image in a synthesizing base image may be discriminated by comparing parts of the image, which represent contour lines of subjects, with each other in terms of clearness. For example, assuming that a subject having a clear contour line and a subject having an unclear contour line coexist, the subject having an unclear contour line is recognized as a blurred image part derived from an unmatched focal length. The area may be regarded as an object-of-synthesis area. Thus, an object-of-synthesis area like the one shown in FIG. 14 can be designated.

The adoption of, for example, the foregoing technique makes it possible to designate an object-of-synthesis area as automatic designation. Naturally, other techniques for automatic designation are conceivable.

When one object-of-synthesis area or multiple object-of-synthesis areas are designated through automatic designation, an image containing the object-of-synthesis areas like, for example, the ones shown in FIG. 13 or FIG. 14 may be displayed on or outputted to the display unit 2 in order to prompt a user to decide whether synthesizing processing should be performed on each of the object-of-synthesis areas. In this case, the user manipulatively enters OK or Cancel in relation to execution of synthesis for each of the displayed object-of-synthesis areas, and thus finalizes each of the object-of-synthesis areas.

When an object-of-synthesis area is manually designated, a synthesizing base image is displayed on the display unit 2. A user performs a manipulation of designating an area in the synthesizing base image as the object-of-synthesis area. The user performs the manipulation of designating an area according to a method of manipulating a touch pad, a touch panel, or a cursor or pointer, or a method of entry a numerical value.

FIG. 15, FIG. 16, FIG. 17, and FIG. 18 show examples of area designation entry. One square of the lattice in each of the drawings shall express one of pixels constituting an image.

Figure 15:
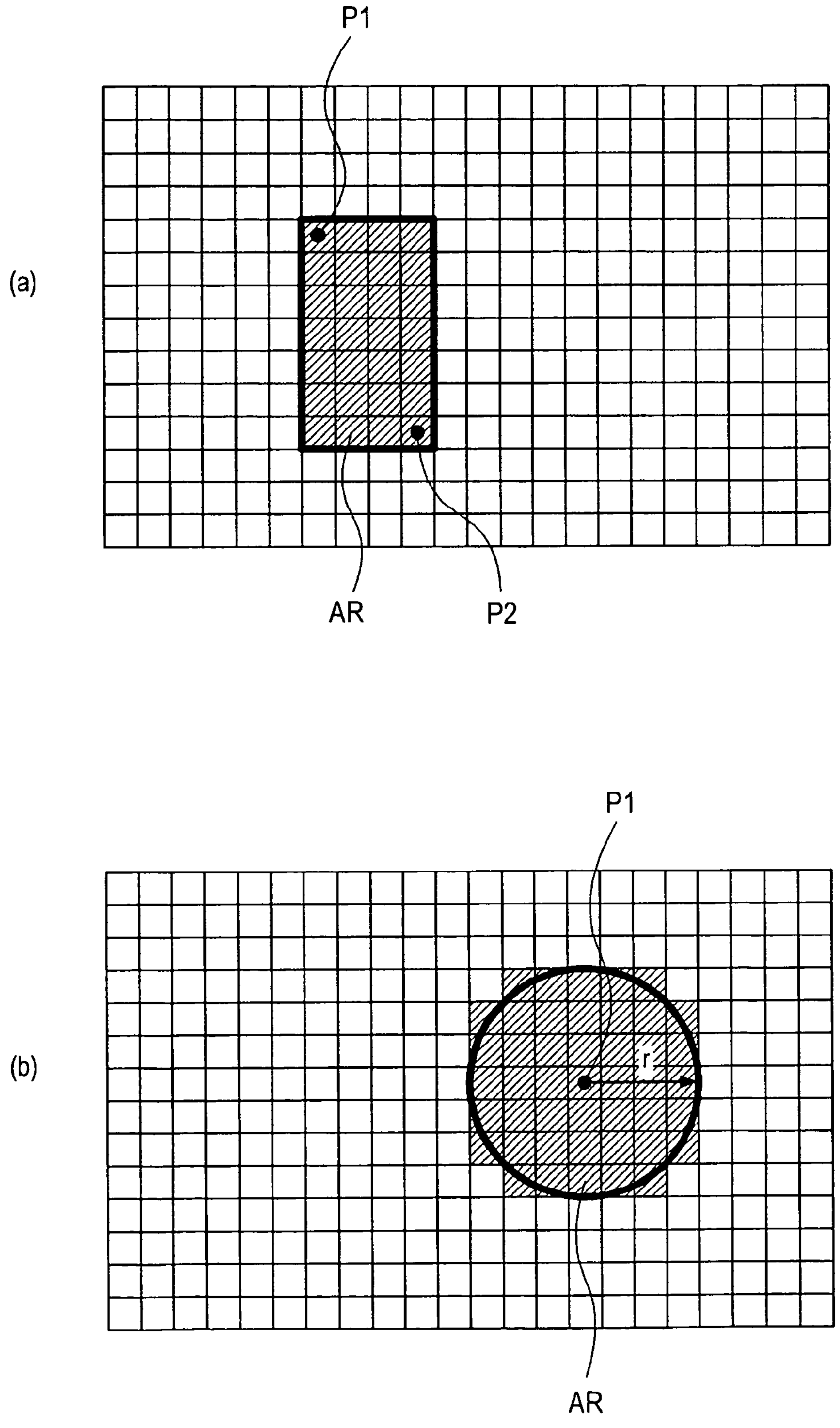
FIG. 15 includes explanatory diagrams concerning a manual designation method for an object-of-synthesis area of the embodiment.

Section (a) of FIG. 15 shows an example in which when a user designates two positions P1 and P2 on a screen through manipulative entry, a rectangular area having pixels, which are located at the positions P1 and P2, as diagonal points thereof is regarded as an object-of-synthesis area AR.

Section (b) of FIG. 15 shows an example in which when a user designates one position P1 on a screen through manipulative entry and enters a value of a radius r, a pixel area of a hatched part contained in a circle of the radius r having the pixel at the position P1 as the center thereof is regarded as an object-of-synthesis area AR.

Figure 16:
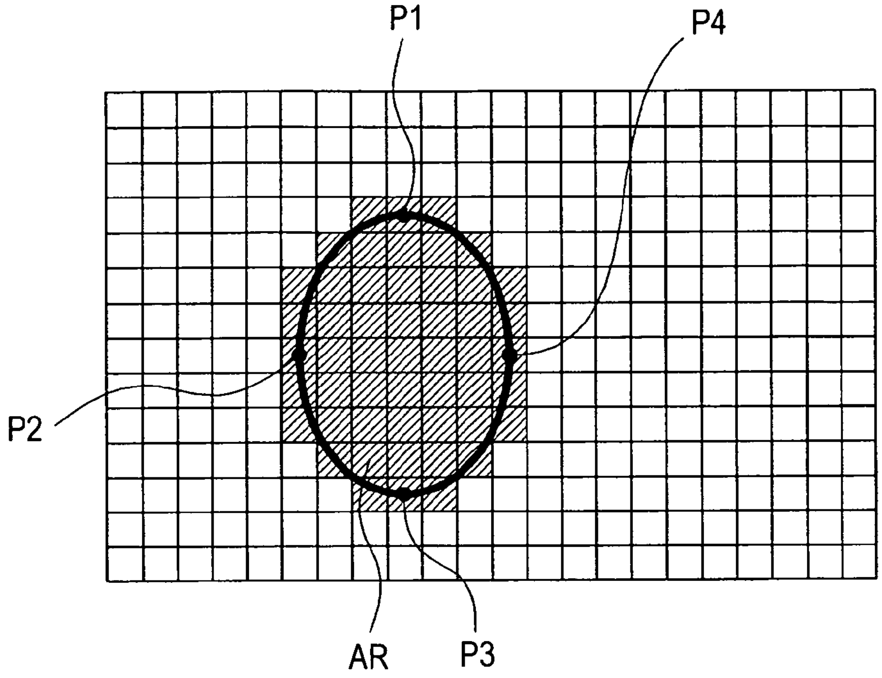
FIG. 16 includes explanatory diagrams concerning the manual designation method for an object-of-synthesis area of the embodiment.
Figure 16:
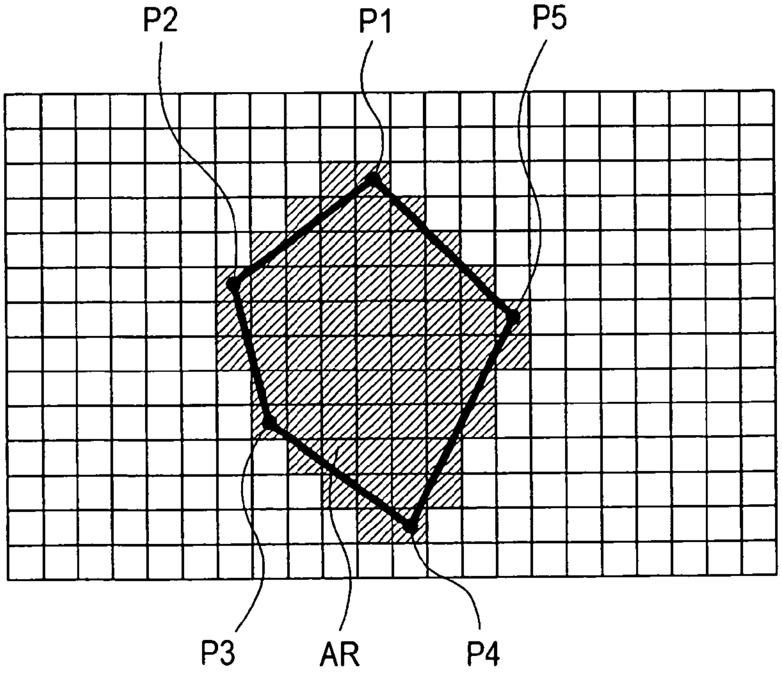

Section (a) of FIG. 16 shows an example in which when a user designates four positions P1, P2, P3, and P4 on a screen through manipulative entry, a substantially elliptical pixel area of a hatched part containing the pixels at the positions P1, P2, P3, and P4 is regarded as an object-of-synthesis area AR.

Section (b) of FIG. 16 shows an example in which when a user designates three or more arbitrary positions, for example, five positions P1, P2, P3, P4, and P5 on a screen through manipulative entry, a pixel area of a hatched part contained in a range delineated by linking the pixels at the positions P1, P2, P3, P4, and P5 with straight lines is regarded as an object-of-synthesis area AR.

Figure 17:
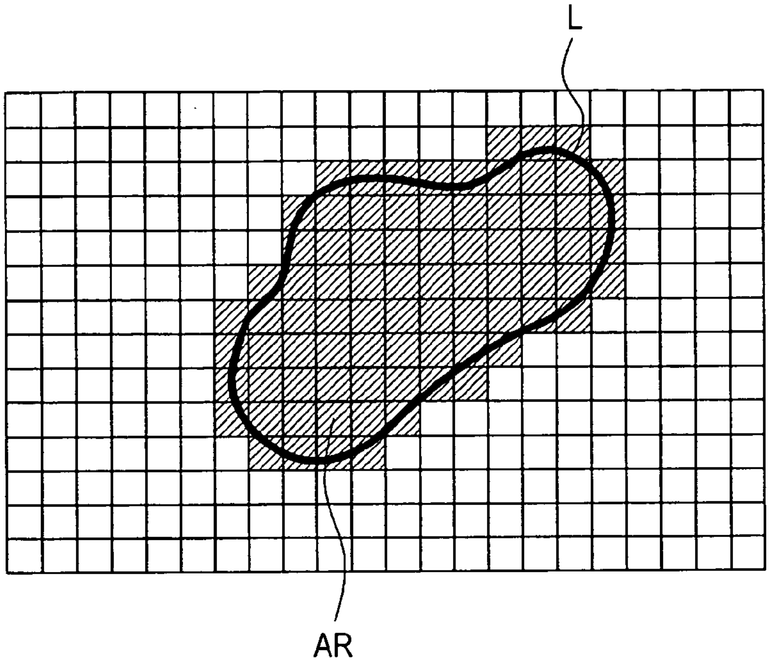
FIG. 17 includes explanatory diagrams concerning the manual designation method for an object-of-synthesis area of the embodiment.
Figure 17:
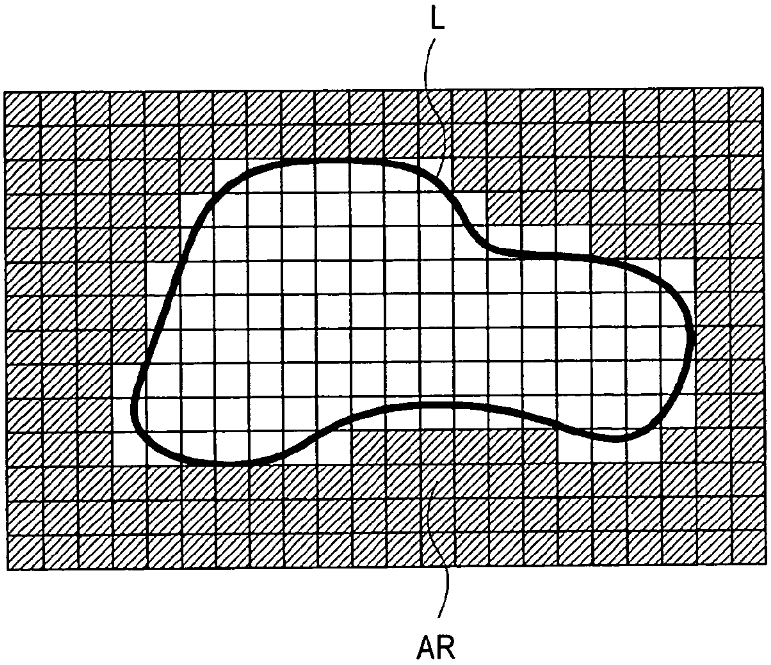

Section (a) of FIG. 17 shows an example in which when a user draws a closed curve L on a screen through manipulative entry, a pixel area of a hatched part contained in a range determined with the closed curve L is regarded as an object-of-synthesis area AR.

Section (b) of FIG. 17 shows an example in which when a user draws a closed curve L on a screen through manipulative entry, a pixel area of a hatched part excluding pixels contained in a range determined with the closed curve L is regarded as an object-of-synthesis area AR.

Figure 18:
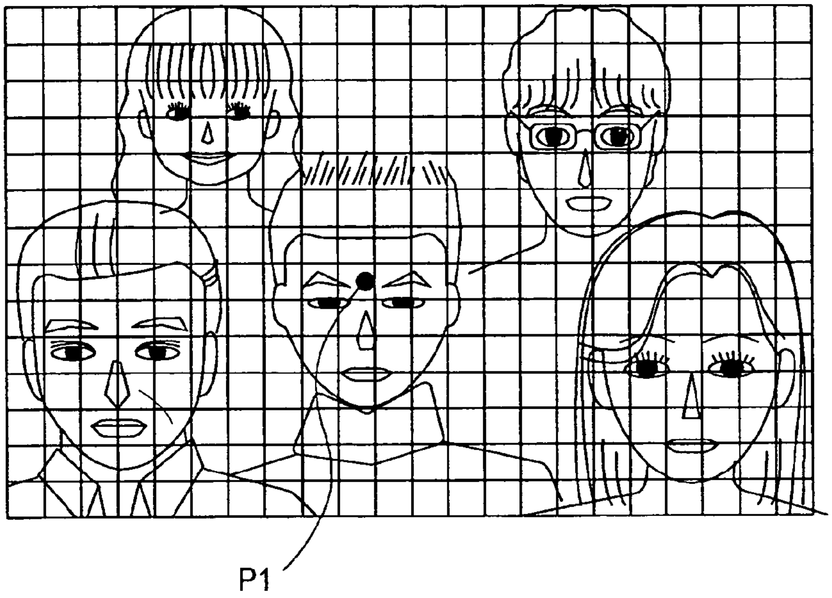
FIG. 18 includes explanatory diagrams concerning the manual designation method for an object-of-synthesis area of the embodiment.
Figure 18:
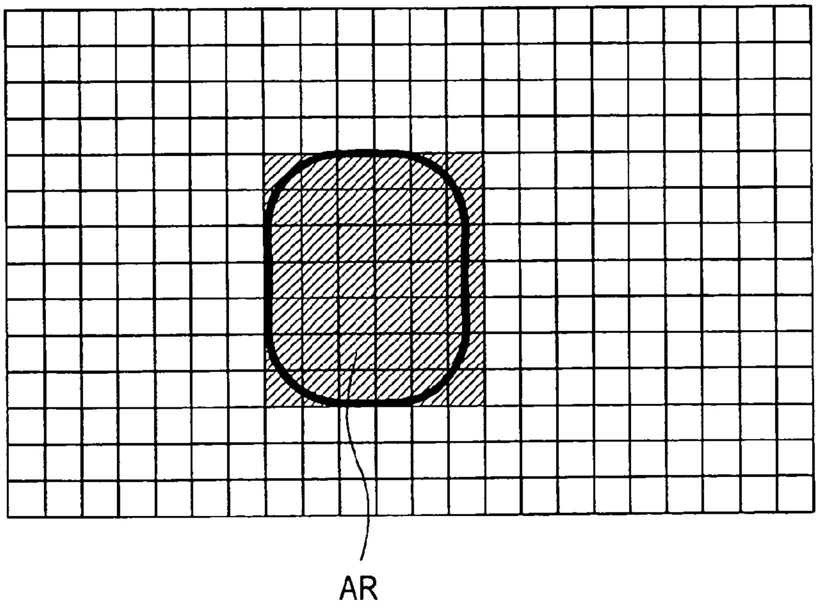

Sections (a) and (b) of FIG. 18 show an example in which a user designates a person in an image. As shown in section (a) of FIG. 18, a position P1 is entered in order to designate a certain person in the image. Responsively, an area of a facial image of the person at the position P1 is identified, and the area of the facial image of the designated person is, as shown in section (b) of FIG. 18, regarded as an object-of-synthesis area AR.

Designation of an object-of-synthesis area can be achieved as manual designation according to, for example, the foregoing technique. Naturally, other techniques for manual designation are conceivable.

At step F203 in FIG. 12, the image analysis/synthesis unit 12 performs designating processing of an object-of-synthesis area AR through the foregoing automatic designation or manual designation. At step F204, the image analysis/synthesis unit 12 verifies whether an object-of-synthesis area AR has been designated.

For example, when any of various image analyses is performed as automatic designation, if a pixel area to be regarded as an object-of-synthesis area is not found, Object-of-synthesis Area Not Found is identified. Even when one object-of-synthesis area or multiple object-of-synthesis areas are designated through automatic designation, if a user performs a canceling manipulation because synthesizing processing is not needed for all the object-of-synthesis areas, Object-of-synthesis Area Not Found is identified.

Further, when manual designation is carried out, if a user does not perform area entry because an area to be synthesized with a displayed synthesizing base area (namely, an area a user wants to retouch) is not found, or if the user performs a canceling manipulation of synthesizing processing itself, Object-of-synthesis Area Not Found is identified.

When Object-of-synthesis Area Not Found is identified, a Synthesis Not Needed notification is transmitted, at step F205, to the system controller 10 because synthesizing processing is not needed for pickup image data designated this time by the system controller 10. The processing mentioned in FIG. 12 is terminated.

When one or more object-of-synthesis areas are designated, the processing of the image analysis/synthesis unit 12 proceeds to step F206, and a processing control variable x is set to 1 for subsequent processing.

At step F207, the processing of retrieving a partial image (pixel data) for synthesis from another frame is carried out for an object-of-synthesis area AR(x). Namely, pixel data to be fitted in the first object-of-synthesis area AR1 out of one object-of-synthesis area or multiple object-of-synthesis areas designated at step F203 is retrieved.

The processing also presumably falls into automatic processing and manual processing.

In the case of automatic processing, the image analysis/synthesis unit 12 analyzes the contents of an image in an area in each of frames other than a synthesizing base image which corresponds to the object-of-synthesis area AR, and extracts pixel data for synthesis in the manner presented as an example below.

For example, when a facial image showing the closed eyes like the image shown in section (a) of FIG. 13 is regarded as an object-of-synthesis area AR, a facial image in which the eyes can be detected is retrieved from a corresponding pixel area in a frame preceding or succeeding the synthesizing base image. When a frame in which a facial image in the pixel area corresponding to the object-of-synthesis area AR is the facial image in which the eyes are open is detected, the pixel data in the pixel area in the frame is regarded as pixel data to be fitted in the object-of-synthesis area AR.

When a facial image in which a person does not look to the front is recognized as an object-of-synthesis area AR like the object-of-synthesis area AR1 in section (b) of FIG. 13, a facial image in which the person looks to the front is retrieved from a corresponding pixel area in a frame preceding or succeeding the synthesizing base image. When a frame in which a facial image in a pixel area corresponding to the object-of-synthesis area AR is the facial image in which the person looks to the front is detected, the pixel data in the pixel area in the frame is regarded as pixel data to be fitted in the object-of-synthesis area AR. Whether a person looks to the front can be recognized based on, for example, the positions of the eyeballs or the positional relationship among the elements (eyes, nose, mouth, ears, and so on) of the face.

When a facial image showing a disturbed expression is regarded as an object-of-synthesis area AR similar to the object-of-synthesis area AR2 in section (b) of FIG. 13, a facial image showing a smile or a normal expression is retrieved from a corresponding pixel area in a frame preceding or succeeding the synthesizing base image. When a frame in which a facial image in a pixel area corresponding to the object-of-synthesis area AR is the facial image showing a smile or a normal expression is detected, the pixel data in the pixel area in the frame is regarded as pixel data to be fitted in the object-of-synthesis area AR.

When an area of an unnecessary subject like an unrelated person shown in section (c) of FIG. 13 is regarded as an object-of-synthesis area AR, a frame in which an unrelated person or the like is not found in a corresponding pixel area is retrieved from a frame preceding or succeeding the synthesizing base image. The pixel data in the pixel area in the frame is regarded as pixel data to be fitted in the object-of-synthesis area AR.

As shown in section (d) of FIG. 13, when an area that is markedly different from the other in a light intensity, luminance, or shade is regarded as an object-of-synthesis area AR, a frame in which the difference in light intensity, luminance, or shade of a corresponding pixel area from the part of the synthesizing base image other than the object-of-synthesis area AR is retrieved from frames preceding or succeeding the synthesizing base image. The pixel data in the pixel area in the retrieved frame is regarded as pixel data to be fitted in the object-of-synthesis area AR.

As shown in FIG. 14, when a blurred area of a subject with which a focal length is not matched is regarded as an object-of-synthesis area AR, a frame in which a corresponding pixel area is an in-focus image is detected from frames preceding or succeeding the synthesizing base image. The pixel data in the pixel area in the frame is regarded as pixel data to be fitted in the object-of-synthesis area AR.

When pixel data for synthesis is retrieved through manual processing, examples described below are conceivable.

For example, a synthesizing base image is displayed on or outputted to the display unit 2, and pixel data in a corresponding area in another frame is sequentially synthesized with an object-of-synthesis area AR(x) and displayed. For example, when the synthesizing base image is a frame F#1, a corresponding area in a frame F#2 is fitted in an object-of-synthesis area AR1, and the resultant image is displayed. Thereafter, a corresponding area in a frame F#3 is fitted in the object-of-synthesis area AR1 and the resultant image is displayed. Thus, the pixel area of the object-of-synthesis area AR(x) is replaced sequentially with pixels in other frames, and the resultant images are sequentially displayed so that a user can check the images. When the user performs a manipulation of determining an appropriate image, a frame to be synthesized is finalized, and the pixel data in the frame is regarded as pixel data to be fitted in the object-of-synthesis area AR.

The synthetic images of the object-of-synthesis area AR(x) with other frames may not be sequentially displayed, but may be listed so that a user can simultaneously compare the images with one another so as to perform a selecting manipulation.

For sequentially displaying the synthetic images with respective frames, a user interface allowing synthetic frames to change along with a user's manipulation concerning the depth of time will do. For example, a scroll bar for scrolling in a time-base direction is displayed, and a user is allowed to designate a movement in the time-base direction using a predetermined operating piece or by performing a manipulation that is a user's behavior. Frames each of which has pixel data fitted in an object-of-synthesis area AR(x) are changed by performing successive manipulations in the time-base direction. Thus, an image whose object-of-synthesis area AR(x) alone leads or lags in the time-base direction can be displayed. Eventually, the user can determine an appropriate synthesizing frame.

As for a manipulation of designating a movement in the time-basis direction, for example, a touch pad is included, and a magnitude of movement concerning a time instant or a future or past direction may conceivably be designated according to a magnitude of movement (a magnitude of dragging movement) or a direction of movement from a touched point. As for the direction, for example, a rightward or upward movement is regarded as being positive (future direction), and a leftward or downward movement is regarded as a movement in a negative direction (past direction).

A pressure sensitive touch pad may be included so that a magnitude of movement concerning a time instant can be designated with the intensity of a pressure.

As a user's behavior, shaking the head or a manipulation of tapping the flank of the imaging device 1 mounted on the head may be regarded as a manipulation of designating a magnitude of movement or a direction thereof.

Responsively to a manipulation of designating a magnitude of movement or a direction thereof, time difference information TM on each frame is referenced in order to determine a frame associated with the designating manipulation. A synthetic image is then produced.

If the result of retrieval of pixel data for synthesis performed responsively to automatic analysis or manual handling at step F207 reveals that pixel data to be fitted as a partial image for synthesis in an object-of-synthesis area AR is found, the image analysis/synthesis unit 12 proceeds from step F208 to step F209, and performs synthesizing processing of an object-of-synthesis area AR(x). Specifically, pixel data in the object-of-synthesis area AR(x) in a synthesizing base image is replaced with pixel data in another retrieved frame. For example, as for the object-of-synthesis area AR1 in section (a) of FIG. 13, when a corresponding area in a frame F#4 out of the images of frames shown in FIG. 5 is selected as the partial image for synthesis, the pixel data in an area in the frame F#4 corresponding to the object-of-synthesis area AR(x) is fitted in the object-of-synthesis area AR(x) in the synthesizing base image (frame F#1).

If an appropriate partial image for synthesis is not found during the processing of retrieving the contents of an image of another frame performed at step F207, processing proceeds from step F208 to step F210. The object-of-synthesis area AR(x) is recognized as Synthesis Disabled.

At step F211, whether a processing control variable x equals n is recognized. Herein, n denotes the number of object-of-synthesis areas AR designated at step F203. Namely, whether processing is completed for all designated object-of-synthesis areas AR is verified.

If an unprocessed object-of-synthesis area AR is found, the processing control variable x is incremented at step F212 and processing returns to step F207. The processing is then performed on the next object-of-synthesis area AR(x) in the same manner.

When x=n is established at step F211, the processing on all the object-of-synthesis areas AR designated at step F203 is completed. In this case, whether all the object-of-synthesis areas AR are recognized as Synthesis Disabled at step F210 is verified at step F213. If all the object-of-synthesis areas AR are recognized as Synthesis Disabled, the processing of the image analysis/synthesis unit 12 proceeds to step F215, and a Synthesis Disabled notification is transmitted to the system controller 10.

If synthesizing processing of step F209 is performed on at least one object-of-synthesis area AR, processing proceeds to step F214 and a Synthesis Completed notification is transmitted to the system controller 10. The processing described in FIG. 12 is then terminated.

For example, through the pieces of processing to be performed by the system controller 10 and image analysis/synthesis unit 12 respectively as mentioned in FIG. 11 and FIG. 12, synthetic image data like the one shown in section (b) of FIG. 4, section (b) of FIG. 7, section (b) of FIG. 8, section (c) of FIG. 9, or section (b) of FIG. 10 is produced and stored in the storage unit 14 as specified as synthetic image data mVD in section (b) of FIG. 6.

5. Advantage of the Embodiment, Variants, and Extended Examples

According to the foregoing embodiment, one frame of pickup image data is regarded as a synthesizing base image, and synthesizing processing of replacing pixel data in an object-of-synthesis area AR, which is designated in the synthesizing base image, with image data in another frame is carried out. This has the advantage that a pickup image whose user satisfaction level is high can be readily produced.

For example, in a group photograph, a synthetic image in which all people have their eyes left open, have soft expressions, or look to the front, or a synthetic image in which all people appear not to be blurred can be readily produced. An image having an unnecessary subject deleted therefrom or an image that gives a sense of unity over an entire screen can be readily produced. Therefore, even when a user thinks that he/she has failed in imaging, an image can be easily retouched. A user satisfaction level for photography can be improved.

Further, an interesting image can be produced through manual handling in synthesizing processing. The potential of a general user in photography or the use range of an image can be expanded.

Synthetic image data is stored in, for example, the storage unit 14. When the synthetic image data is displayed, a preferable pickup image can be presented to a user.

As for synthetic image data items mVD1, mVD2, etc. produced, as listed in FIG. 6(*b*), based on pickup image data items VD1, VD2, etc., the processing of sequentially displaying the image data items responsively to a user's manipulation, sequentially displaying the image data items automatically according to a slide-show method, or listing the image data items in the form of thumbnail images may be carried out.

The present invention is not limited to the aforesaid embodiment. Various variants or extended examples are conceivable as examples of the constitution of the imaging device 1 or examples of processing thereof.

When synthesizing processing is performed at step F209 in FIG. 12, not only pixel data in an object-of-synthesis area AR is merely replaced with pixel data in another frame but also an attempt may be made to produce a more natural synthetic image.

Specifically, although images of frames at different time instants are synthesized with each other during synthesizing processing, pixels in both a current image and a target image may be blended (linearly coupled to each other) for a boundary area in order to smooth the boundary between frames (a frame of a synthesizing base image and a frame from which pixel data for synthesis is extracted).

In order to smooth the boundary between images at different time instants, pixels in a frame intermediate (temporally intermediate) between a frame that is a synthesizing base image and a frame from which pixel data for synthesis is extracted may be used so that the time concerning a boundary area will be more continuous to adjoining times.

Figure 19:
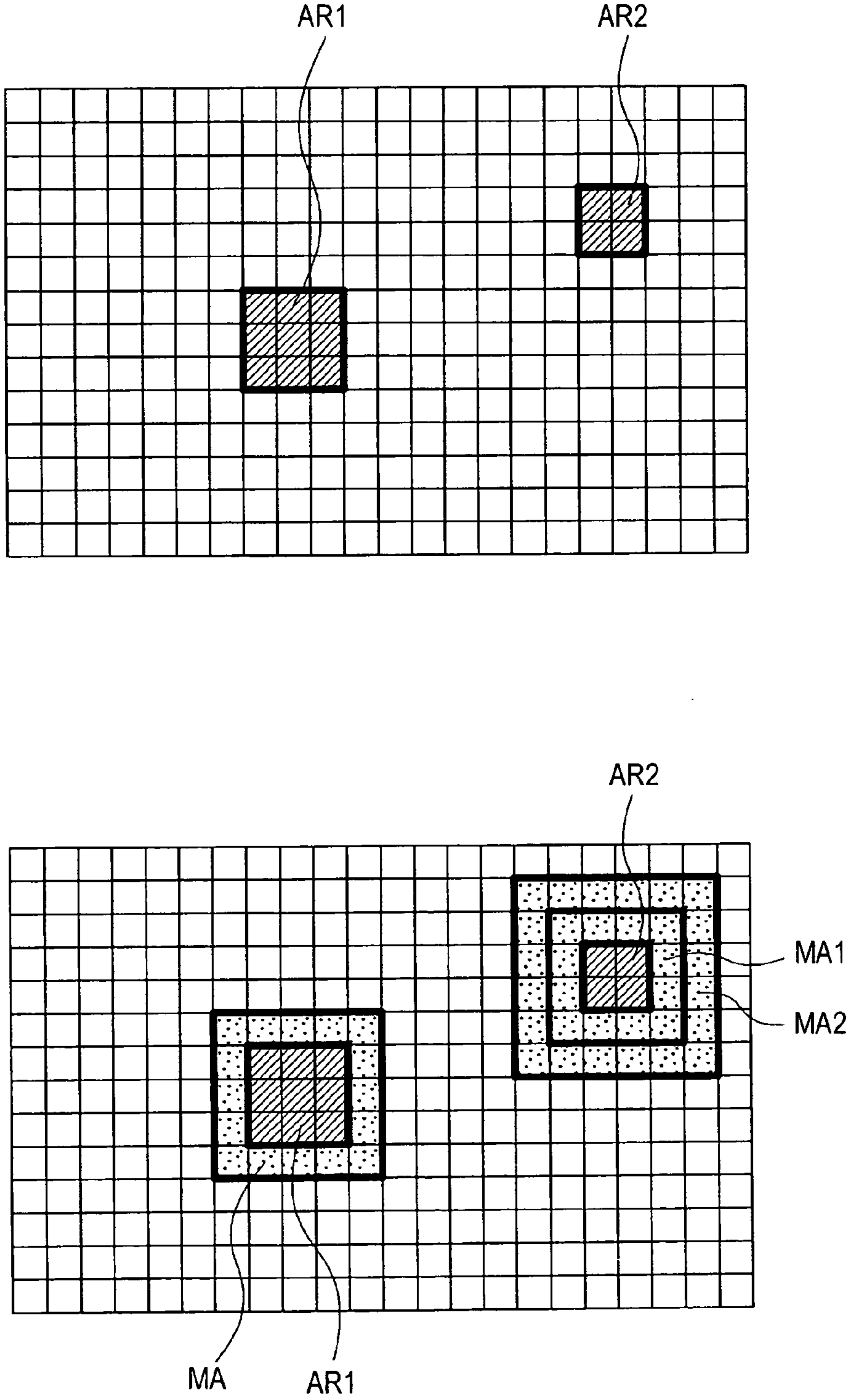
FIG. 19 includes explanatory diagrams concerning an example of processing to be performed on a boundary area during synthesis of the embodiment.

As shown in section (a) of FIG. 19, assume that object-of-synthesis areas AR1 and AR2 are designated in a certain synthesizing base image. As shown in section (b) of FIG. 19, pixel data items extracted from other frames are allocated to the object-of-synthesis areas AR1 and AR2 respectively shown as hatched parts. Pixels in an intermediate frame are allocated to the perimeter of each of the object-of-synthesis areas AR1 and AR2.

For example, assuming that a synthesizing base image is a frame F#1 and pixel data in a frame #3 is allocated to an object-of-synthesis area AR1, pixel data in a frame #2 is allocated as pixel data MA on the perimeter of the object-of-synthesis area AR1.

Assuming that pixel data in a frame #6 is allocated to an object-of-synthesis area AR2, pixel data in a frame #4 is allocated as pixel data MA1 on the perimeter of the object-of-synthesis area AR2. Further, pixel data in a frame #2 is allocated as pixel data MA2 on the perimeter of the pixel data MA1.

In this case, a time difference in the boundary at a synthesizing position is diminished. Accordingly, synthetic image data represents a more natural image.

In another frame, the same subject may not be located in a pixel area corresponding to an object-of-synthesis area AR in a synthesizing base image because of the subject's motion. For example, while a person of a subject is walking, if the person is imaged, a pixel range that is a facial area of the person differs from frame to frame.

Therefore, for example, a feature point of an image may be extracted as an object-of-synthesis area AR, and a position in an image of another frame corresponding to the position in a synthesizing base image may be corrected.

For example, three feature points in an image are used to calculate a matrix for movement, rotation, or enlargement (affine transformation) so as to achieve correction. When a facial image is an object, the eyes of a face and the mouth thereof are preferably adopted as the three feature points.

An image processing device of the present invention is, presumably, realized as any of diverse devices aside from as the imaging device 1.

Figure 20:
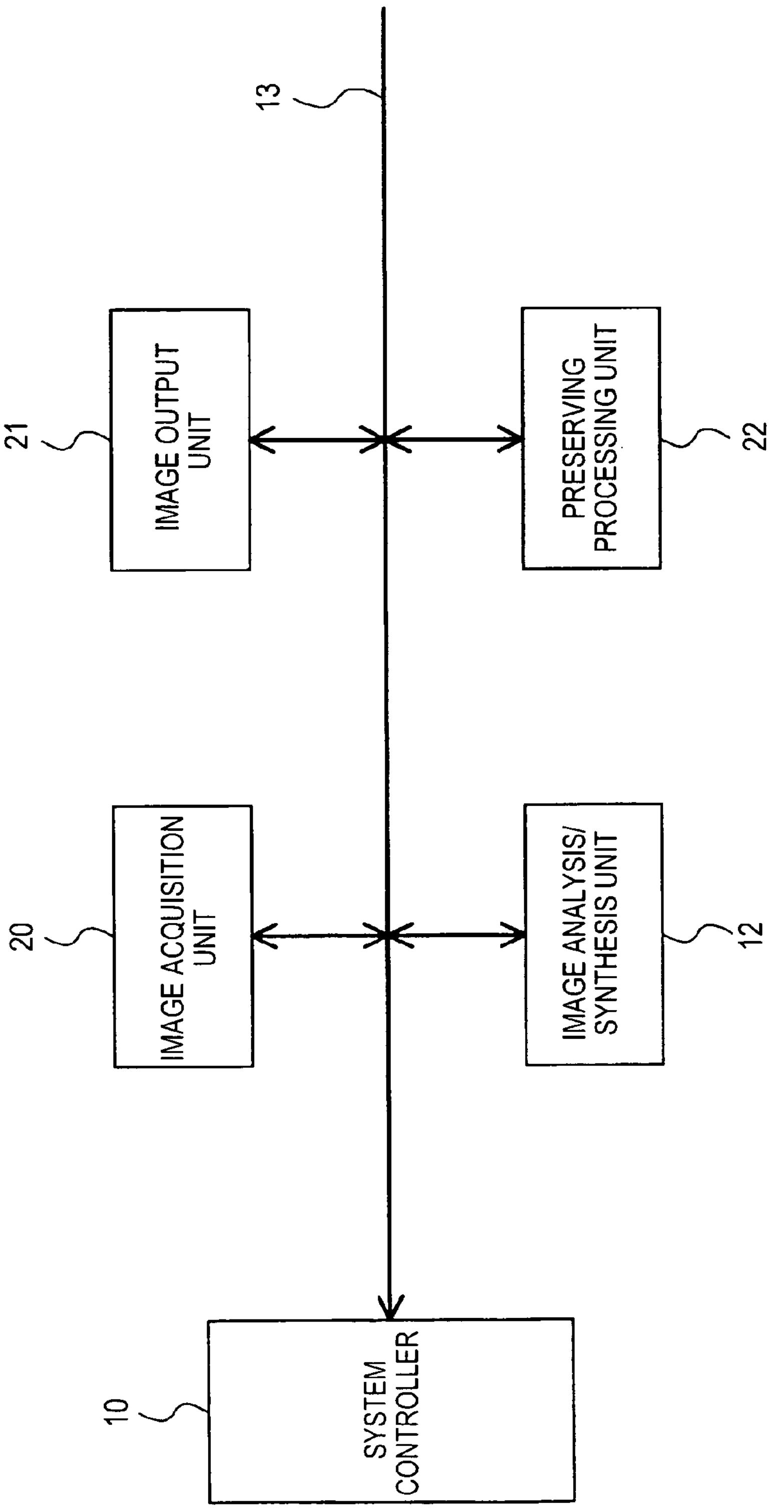
FIG. 20 is an explanatory diagram of constituent features of the present invention.

FIG. 20 shows, as components of an image processing device of the present invention, a system controller 10 serving as a control means, an image acquisition unit 20, an image analysis/synthesis unit 12, a preserving processing unit 22, and an image output unit 21.

As any of various pieces of equipment including, for example, the above components, the image processing device of the present invention can be realized.

The image acquisition unit 20 is a region that acquires pickup image data items of multiple frames picked up at different time points, that is, pickup image data items that are objects of synthesizing processing. In the imaging device 1 of the aforesaid embodiment, the image acquisition unit 20 is equivalent to the imaging unit 3 and imaging control unit 6.

Aside from a region serving as an imaging function, the communication unit 15 that receives pickup image data items of multiple frames, which are objects of synthesizing processing, from the external equipment 70 may act as the image acquisition unit 20. Naturally, a unit that receives pickup image data items from the external equipment 70 through cable connection will do. Further, a reproduction drive that performs reproduction on a portable recording medium, for example, an optical disk or a memory card and reads pickup image data items recorded in the portable recording medium may act as the image acquisition unit 20.

What are referred to as pickup image data items of multiple frames to be acquired by the image acquisition unit 20 may be multiple still-image data items or motion-picture data.

The preserving processing unit 22 is a region that performs the processing of preserving synthetic image data and is equivalent to the storage unit 14 in the aforesaid embodiment.

When pickup image data and assessment data are transmitted to the external equipment 70 in order to execute preservation in the external equipment 70, the communication unit 15 that performs the transmission is equivalent to the preserving processing unit 22. Naturally, either radio transmission or wired transmission will do.

In the aforesaid embodiment, the display unit 2 that displays or outputs preserved pickup image data is equivalent to the image output unit 21. An output unit that outputs an image signal for display on an external monitor device may act as the image output unit 21.

The communication unit 15 that transmits preserved pickup image data to the external equipment 70 over a cable or by radio may act as the image output unit 21.

A recording drive that records preserved pickup image data in a portable recording medium so that the pickup image data can be carried out from the device using the portable recording medium may act as the image output unit 21.

As mentioned above, for example, as the image acquisition unit 20, image output unit 21, and preserving processing unit 22, quite diverse forms are presumed. In consideration of this point, the present invention can be realized as not only an imaging device such as a still camera or a video camera but also as a monitor display device, a communication device, or an image data preservation device which does not have an imaging function, or an image editing device that performs image synthesis.

What is referred to as pickup image data items of multiple frames to be used to produce synthetic image data may not be frame image data items picked up substantially continuously but may be image data items picked up at considerably discrete timings.

For example, in the wearable imaging device 1 like the one shown in section (a) or (b) of FIG. 1, when imaging is performed regularly, pickup image data items of various scenes which a user views during activities of a day can be acquired. Such pickup image data items of multiple frames that are somewhat unrelated to one another may be used to perform synthesizing processing. For example, a synthetic image having the scenes of the day synthesized with one another in the form of a collage can be produced.

Likewise, for example, when pickup image data items sequentially picked up at a resort or the like are acquired through communication using an image sharing service or the like, such pickup image data items and pickup image data items which a user has picked up at the same resort may conceivably be used to perform synthesizing processing.

Production of synthetic image data as a still image has been described. The production can be extended to production of synthetic image data as a motion picture.

For example, a synthetic image in which the time progress manner in a pixel area regarded as an object-of-synthesis area AR may be changed from the time progress manner in the surrounding area can be realized. Specifically, only the object-of-synthesis area AR in each of frames constituting a motion picture is replaced with pixel data in a different frame. Thus, a synthetic image that shows on part of a screen a scene of a later time or a scene of an earlier time, or a fast time progress or a slow time progress can be produced.

Further, the present invention may be applied to a high-dimensional image such as a three-dimensional image.

The invention claimed is:

1. An image processing method comprising:

acquiring pickup image data items of multiple frames, which are picked up at different times, as pickup image data items to be used for synthesizing processing;

designating one or more object-of-synthesis areas in a selected frame out of the acquired multiple frames;

providing an indication to a user that synthesizing processing may be performed on a first object-of-synthesis area out of the one or more object-of-synthesis areas; and when receiving input from the user indicating that synthesizing processing should be performed on the first object-of-synthesis area, producing synthetic image data by performing synthesizing processing of replacing pixel data in the first object-of-synthesis area with pixel data in another frame out of the multiple frames; and performing preserving processing on the synthetic image data, wherein prior to performing synthesizing processing, the user manipulates at least one of the one or more object-of-synthesis areas by selecting said at least one of the one or more object-of-synthesis areas within the selected frame.

2. The image processing device method according to claim 1, wherein acquiring pickup image data items comprises acquiring pickup image data of at least one frame, which is included in the pickup image data items to be used for the synthesizing processing, through imaging by an imaging unit.

3. The image processing method according to claim 2, wherein acquiring pickup image data items comprises acquiring pickup image data items of multiple frames, which are used for the synthesizing processing, through imaging by the imaging unit.

4. The image processing method according to claim 2, wherein the imaging unit is formed using a CCD sensor or a CMOS sensor as an image sensor.

5. The image processing method according to claim 1, wherein acquiring pickup image data items comprises receiving and acquiring pickup image data of at least one frame, which is included in the pickup image data items to be used for the synthesizing processing, through communication with external equipment by a communication unit.

6. The image processing method according to claim 1, wherein acquiring pickup image data items comprises acquiring pickup image data of at least one frame, which is included in the pickup image data items to be used for the synthesizing processing, through reproduction from a portable recording medium by a reproduction unit.

7. The image processing method according to claim 1, wherein the preserving processing means includes a recording unit to record information in a recording medium, and is adapted to perform the performing preserving processing comprises recording the synthetic image data in a recording medium using a recording unit.

8. The image processing method according to claim 1, wherein performing preserving processing comprises transmitting the synthetic image data to external equipment using a communication unit.

9. The image processing method according to claim 1, wherein designating one or more object-of-synthesis areas comprises image analyzing processing.

10. The image processing method according to claim 9, wherein designating one or more object-of-synthesis areas comprises performing a discrimination of all or part of the opening or closing of the eyes in a facial image of a person contained in a frame image, the facial expression, the direction of a face, and the color of the eyes through image analyzing processing, and designates the one or more object-of-synthesis areas on the basis of a result of the discrimination.

11. The image processing method according to claim 1, wherein designating one or more object-of-synthesis areas is responsive to entry performed at an operating input means.

12. The image processing method according to claim 1, wherein designating one or more object-of-synthesis areas comprises determining a frame to be used as another frame through image analyzing processing performed on each of the multiple frames, and fetch pixel data, which is synthesized with at least one of the one or more object-of-synthesis areas, from the determined frame.

13. The image processing method according to claim 1, wherein designating one or more object-of-synthesis areas comprises:

selecting a frame to be used as another frame from among the multiple frames responsive to entry performed at an operating input means, and fetching pixel data, which is synthesized with at least one of the one or more object-of-synthesis areas, from the selected frame.

14. The image processing method according to claim 1, further comprising performing outputting processing on the synthetic image data.

15. The image processing method according to claim 14, wherein performing outputting processing on the synthetic image data comprises displaying or outputting the synthetic image data on or to a display unit.

16. The image processing method according to claim 14, wherein performing outputting processing on the synthetic image data comprises transmission or output of the synthetic image data to external equipment via a communication unit.

17. The image processing method according to claim 14, wherein performing outputting processing on the synthetic image data comprises recording the synthetic image data in a portable recording medium via a recording unit.

* * * * *